United States Patent [19]
Ito

[11] Patent Number: 5,930,571
[45] Date of Patent: Jul. 27, 1999

[54] IMAGE FORMING APPARATUS AND A METHOD FOR FORMING AN IMAGE ON PLURAL SURFACES AT THE SAME TIME

[75] Inventor: Norifumi Ito, Kawasaki, Japan

[73] Assignee: Ricoh Company, Ltd., Tokyo, Japan

[21] Appl. No.: 09/084,309

[22] Filed: May 26, 1998

[30] Foreign Application Priority Data

May 26, 1997 [JP] Japan ..................................... 9-149956
May 20, 1998 [JP] Japan ................................... 10-137921

[51] Int. Cl.⁶ .................................................. G03G 15/14
[52] U.S. Cl. ........................... 399/302; 399/83; 399/308; 399/368; 358/403; 358/296
[58] Field of Search ................................ 399/83, 85, 302, 399/308, 367, 368; 358/403, 523, 296

[56] References Cited

U.S. PATENT DOCUMENTS

| | | | |
|---|---|---|---|
| 4,949,128 | 8/1990 | Parsons | 399/302 |
| 5,159,390 | 10/1992 | Imaizumi | 399/204 |
| 5,596,400 | 1/1997 | Kasamatsu et al. | 399/368 X |

*Primary Examiner*—Matthew S. Smith
*Attorney, Agent, or Firm*—Oblon, Spivak, McClelland, Maier & Neustadt, P.C.

[57] ABSTRACT

In an image forming apparatus and method for forming an image on plural surfaces in which the image forming sequence is practiced at the same time regardless of the type of sheets of the manuscript document which are sent from the ADF to the manuscript document reading-out apparatus and set thereon. The image information read out by scanning the first manuscript document sent from the ADF to the first reading-out position 25 at the upstream side of the manuscript document reading-out section is temporarily stored and kept therein. At the time point of finishing the scanning operation for the first manuscript document, the first manuscript document set on the first reading-out position of the manuscript document reading-out section is sent to the second reading-out position 26 at the downstream side. The second manuscript document mounted on the document mounting stand is sent to the first reading-out position. The first manuscript document transfers the toner image onto the intermediate transfer belt in accordance with the image information stored in the page memory. The second manuscript document transfers the toner image onto the intermediate transfer belt in accordance with the read-out image information. The invention relates to the image forming apparatus and method as mentioned above.

42 Claims, 13 Drawing Sheets

IMAGE FORMING APPARATUS AND A METHOD FOR FORMING AN IMAGE ON PLURAL SURFACES AT THE SAME TIME

BACKGROUND OF THE INVENTION

1. Field of the Invention

The present invention relates to an image forming apparatus and a method for simultaneously forming an image on more than one surface. More particularly, the present invention relates to an image forming apparatus and method for forming an image in which a digital color copying machine or a printer apparatus forms an image on more than one surface of an intermediate transfer medium at the same time.

2. Discussion of the Background

As shown in FIG. 6, a digital color copying machine including an automatic manuscript document feeding apparatus (hereinafter, called "ADF") for transferring the images on two surfaces to an intermediate transfer belt at the same time includes an ADF 1, a manuscript document reading-out apparatus 2, an image writing-in unit 3, an image forming unit 4, a primary transfer unit 5, a secondary transfer unit 6, and a fixing unit 7.

The ADF 1 sends the manuscript document to be read out to the manuscript document reading-out apparatus 2 and withdraws the manuscript document read out by the manuscript document reading out apparatus 2. The manuscript document reading out apparatus 2 includes a light source (not shown), a carriage 21 having plural mirrors (unnumbered), a lens 22, a CCD 23, and a buffer 24. The apparatus 2 scans and reads out the manuscript document sent by the ADF 1 and sends the read-out image information to the image writing-in unit 3. The image writing-in unit 3 includes a laser light source (unnumbered), a polygon mirror (unnumbered), etc. (unnumbered), and sends a laser beam 31 including the image information to the image forming unit 4. The image forming unit 4 includes a charger 42 disposed around a photosensitive body 41, a radiating section for radiating the laser beam 31 from the image writing-in unit 3, a color developing section 43 of the rotating type or fixing type for developing Black (K), Cyan (C), Magenta (M), and Yellow (Y), and a drum cleaning section 44. The image forming unit 4 forms an electrostatic latent image with the laser beam 31 on the photosensitive body 41, the surface of which is charged by the charger 42; thereafter, the color developing section 43 visualizes the electrostatic latent image formed by the image forming unit 4. In such manner, a toner image is formed.

The primary transfer unit 5 includes an intermediate transfer belt 51, a primary transfer section 52, a tension roller 53, two pieces of the secondary transfer rollers 54 and 55, a cleaning section 56, and a standard position generating section 57. The intermediate transfer belt 51 can transfer the toner images onto two surfaces at the same time. The intermediate transfer belt 51 performs the primary transferring operation for the toner image on the photosensitive body 41 during an operational period. During the other periods, i.e., when not in the operational period, the intermediate transfer belt 51 is detached from the surface of the photosensitive body 41 by the action of an attaching/detaching mechanism (not shown). The belt 51 is pressed against the surface of the photosensitive body 41 only when the toner image is primarily transferred onto the intermediate transfer belt 51. A secondary transfer unit 6 secondarily transfers the toner image transferred onto the intermediate transfer belt 51 to a transfer material (not shown).

The intermediate transfer belt 51 is constructed so as to become larger (wider) than the maximum transfer paper size (for example, A3) in the copying machine of the present invention. If the transfer paper to be employed is equal to or smaller than the A4 size, the intermediate transfer belts 51 may transfer the toner image for two surfaces (e.g., two sheets of the transfer paper) at the same time.

The operation of forming the image (which is set in the manuscript document reading out apparatus 2 on the intermediate transfer belt 51) in the digital color copying machine constructed as mentioned above is explained with reference to FIGS. 7(a) and 7(b). In FIG. 7(a), the length L of one circumference of the intermediate transfer belt 51 is represented by the distance between the dashed lines.

As shown in FIG. 8, when the read-out image is read out on the full-color manuscript document 8 is formed, the manuscript document 8a set in the first reading out position 25 is scanned by the manuscript document reading-out apparatus 2. As shown in FIG. 7(a), the toner image 81K of Black (K) is transferred onto the intermediate transfer belt 51. Next, the manuscript document 8a is set on the primary reading-out section 25 is scanned again by the manuscript document reading out apparatus 2. Then the toner image 81C of Cyan (C) is transferred onto the intermediate transfer belt 51 which circulates once on the basis of a mark signal from the standard position generating section 57. This process is repeated for the toner image 81M of Magenta (M) and for the toner image 81Y of Yellow (Y) in this order. In such a manner, the full-color image is formed on the intermediate transfer belt 51. Then, the secondary transfer unit 6 transfers the full-color image onto the transfer material.

As shown in FIG. 9, a first full-color manuscript document 8a is set on the second reading-out position 26 at the downstream side of the manuscript reading-out apparatus 2. When a second full color manuscript document 8b is set on the first reading out position 25, the second manuscript document 8b and the first manuscript document 8a are respectively scanned a predetermined number of times by the manuscript document reading-out apparatus 2.

As shown in FIG. 7(b), the toner images 81K and 82K of Black (K) on the first manuscript document 8a and the second manuscript document 8b are transferred onto the intermediate transfer belt 51 at the time of the first scanning. In a similar way, the toner image 81C and 82C of Cyan (C), the toner images 81M and 82M of Magenta (M), and the toner images 81Y and 82Y of Yellow (Y) are respectively transferred onto the intermediate transfer belt 51, at the time of the second scanning, the third scanning, and the fourth scanning, respectively. In this manner, the full-color image of the first and second manuscript documents 8a and 8b is formed on the intermediate transfer belt 51. Then the secondary transfer unit 6 transfers the full-color image onto the transfer material.

In this manner, the full-color image of the first and second manuscript documents 8a and 8b is formed on the intermediate transfer belt 51.

However, when a black-and-white manuscript document and a full-color manuscript document are set on the manuscript document reading-out apparatus 2, it is necessary to execute at the same time the black-and-white image forming sequence and the full-color image forming sequence. This causes the control operations for the timing of scanning the manuscript document and for primarily transferring to become extremely complicated. Consequently, in conventional image forming apparatuses, the black-and-white image forming sequence and the full-color image forming sequence has to be independently executed, as shown in FIG. 10. Thus, the toner image 81K of Black (K) on the first manuscript document 8a is transferred onto the intermediate transfer belt 51, the toner image 81K is transferred onto the transfer material, thereafter, the toner image 82K of Black (K), the toner image 82C of Cyan (C), the toner image 82M of Magenta (M), and the toner image 82Y of Yellow (Y) are transferred onto the intermediate transfer belt 51 in this order, and as a result, the full-color image on the second manuscript document 8b is formed on the intermediate transfer belt 51.

Furthermore, in the case of forming the images on two sheets of the manuscript document which is sent from the ADF 1 to the manuscript document reading-out apparatus 2 and set thereon, the controls for the exchanging timing for the manuscript document by use of the ADF 1 and the timing of scanning the manuscript document may become very complicated. For this reason, in conventional image forming apparatuses, the image forming sequence has been independently performed for each of the respective manuscript documents.

SUMMARY OF THE INVENTION

Accordingly, it is an object of the present invention to provide an apparatus and a method to overcome the above-mentioned problems of conventional image forming apparatuses.

It is another object of the present invention to provide an apparatus and a method of forming an image in which at least two image forming sequences are performed at the same time, regardless of the types of manuscript document sheets which are sent by the ADR and set onto the manuscript document reading-out apparatus.

It is still another object of the present invention to provide an image forming apparatus and method for forming an image by performing the image forming sequences at the same time, regardless of the types of manuscript documents which are sent by the ADF and set onto the manuscript documents reading-out apparatus.

It is still another object of the present invention to provide an image forming apparatus and method for forming an image on plural surfaces at the same time in which the manuscript document is rapidly replaced and the operational efficiency is increased at the time of forming the image by use of the ADF.

It is still another object of the present invention to provide an image forming apparatus and method for forming an image on plural surfaces at the same time which simplify the image forming sequence and thereby improve the image processing speed.

To achieve the objects of the present invention, an image forming apparatus is provided for forming an image on plural surfaces at the same time. The image forming apparatus includes an image reading-out section for reading out two surfaces of manuscript document and for reading out full-color image information by scanning only once the manuscript document, an automatic manuscript document feeding section for sending the manuscript document to the image reading-out section for reading out the manuscript document and for withdrawing the manuscript document read out from the image reading-out section, and an intermediate transfer member for transferring plural toner images at the same time. A first manuscript document sent to a first reading-out position located at the upstream side of the image reading-out section is scanned out and read out. The image information thus read out by the scanning operation is stored in a page memory. The black toner image of the first manuscript document is transferred onto the intermediate transfer member. The first manuscript document is sent to a second-reading out position located at the downstream side of the image reading-out section. The second manuscript document is sent to the first reading-out position. At the time point of finishing the first-tine scanning of a second manuscript document, the black toner image of the second manuscript document is transferred to the intermediate transfer member and thereafter the next color toner image is transferred onto a position on the intermediate transfer member of the black toner image of the first manuscript document on the basis of the image information of the first manuscript document stored in the page memory. At the time point of finishing such processing as mentioned above by repeating, the operation of scanning the second manuscript document is repeated for a predetermined number of time corresponding to the black-and-white printing or the full-color printing. The first manuscript document and the second manuscript document are discharged from the image reading-out section, the next manuscript document subsequent to the first and second manuscript documents is sent to the image reading-out section.

When the above-mentioned second manuscript document is a black-and-white document, the first manuscript document and the second manuscript document may be discharged from the image reading-out section at the time point of finishing the scanning operation for the second manuscript document.

Furthermore, when the above-mentioned first manuscript document is a black-and-white document, it may be allowed that the image information finished to be read out by scanning the second manuscript document is stored in the page memory in order to keep the image information therein, and the first and second manuscript documents are discharged from the image reading-out section at the time point of finishing the scanning operation for the second manuscript document.

Furthermore, it may be preferable that the above-mentioned processing is performed when the other manuscript document exists in the automatic manuscript document feeding apparatus, in the case that a first manuscript document sent to a first reading-out position located at the upstream side of the image reading-out section is scanned and read out as the manuscript document of the last page in the odd number sheets of the manuscript document, the image information thus read out by the scanning operation is stored in a page memory, and the black toner image of the first manuscript document is transferred onto the intermediate transfer member.

The other image forming apparatus for forming an image on plural surfaces at the same time relating to the present invention includes an image reading-out position for reading out two surfaces of manuscript document and for reading out full-color image information by scanning only once the manuscript document, an automatic manuscript document feeding section for sending the manuscript document to the image reading-out section for reading out the manuscript document and for withdrawing the manuscript document read out from the image reading-out section, and an intermediate transfer member for transferring plural toner images at the same time. A first manuscript document sent to a first reading-out position located at the upstream side of the image reading out section is scanned and read out. The image information thus read out by the scanning operation is stored in a page memory. The first manuscript document is sent to a second reading-out position located at the downstream side of the image reading-out section. A second manuscript document is sent to the first reading-out position. Image information obtained by scanning and reading out the second manuscript document is stored in the page memory in order to keep the image information therein. The first and second manuscript documents are discharged from the image reading-out section, at the time point of finishing the scanning operation of the second manuscript document. The next manuscript document is sent to the image reading-out section. At the same time, the toner image is transferred to the intermediate transfer member on the basis of the image information of the first and second manuscript documents stored in the page memory.

A control section of the digital color copying machine including an automatic manuscript document feeding apparatus (hereinafter, called "ADF") relating to the present invention is composed of an ADF drive control section for controlling the operation of the ADF, a manuscript document reading-out control section for controlling the reading-out operation of the image reading-out section, and image writing-in unit, an image forming unit, a primary transfer unit, a secondary transfer unit, a transfer control section including an intermediate transfer belt for transferring the two surfaces of the toner image for controlling the operations of the primary transfer unit and the secondary transfer unit, a size detecting section for detecting the size of the manuscript document, an automatic color selecting section, and a page memory.

An image reading-out section can read out two surfaces of the manuscript document at the same time, and the same section reads out the image information of full color by scanning the manuscript document only once. The manuscript document size detecting section is mounted on a manuscript document mounting stand (plate) of the ADF, and the section detects the state of setting the manuscript document on the ADF and the size of the document. Furthermore, a sensor is provided on the manuscript document conveying path, and the sensor detects the size of the document during the time period of conveying the manuscript document. The automatic color selecting section judges whether the image of the manuscript document read out by the manuscript reading-out section is black-and-white or full-color, and the section selects an image forming sequence corresponding to the judgment result. The page memory temporarily stores the image information for one sheet of the manuscript document read out by the manuscript document reading-out section.

The transfer control section causes the image writing-in unit to expose the photosensitive body in the image forming unit and thereby perform the writing-in operation of the image information in accordance with the image information of the manuscript document read out by the image reading-out section or the image information stored in the page memory.

Following these processes, the first manuscript document is sent from the ADF to the first reading out position at the upstream side of the manuscript document reading-out section and the first manuscript document is set thereon. When the manuscript document reading-out section scans and reads out the first manuscript document, the automatic color selecting section detects the state in which the first manuscript document is full-color, and the section sends the detected state to the manuscript document reading-out control section and the transfer control section. The first manuscript document is sent to the transfer control section through the manuscript document reading-out control section.

The transfer control section temporarily stores the full-color image information of the first manuscript document in the page memory in order to keep the information therein. The section executes the operations of writing-in, image formation, and the transfer process in accordance with the image information of the first manuscript document stored in the page memory. Thereafter, the transfer control section transfer the Black (K) toner image of the first manuscript document onto the first area of the intermediate transfer belt on the basis of the mark signal from the standard position generating section.

The manuscript document reading-out control section issues a command of replacing the manuscript document to the ADF drive control section at the time point of finishing the scanning operation of the first manuscript document in the manuscript document reading-out section. When the ADF drive control section receives the command of replacing the manuscript document, the section drives the ADF, sends the first manuscript document set on the first reading-out position of the manuscript document reading-out section to the second reading-out position located at the downstream side thereof, and sends the second manuscript document mounted on the ADF manuscript document mounting stand. When the second manuscript document is set on the first reading-out position, the manuscript document reading-out control section causes the manuscript document reading-out section to scan the second manuscript document. When the second manuscript document is scanned and read out by the manuscript document reading-out section, the automatic color selecting section detects the state in which the second manuscript document is black-and-white and thereafter indicates the above matter to the manuscript document reading-out control section and the transfer control section. When the scanning operation for the second manuscript document is finished, the transfer control section issues the command of executing the writing-in of the image information of the second manuscript document, the image formation, and the transfer processing.

The Black (K) toner image of the second manuscript document is transferred onto the second area located at the downstream side of the first area on which the toner image is formed. When the intermediate transfer belt rotates by one cycle, the transfer control section transfers the Cyan (C) toner image of the first manuscript document onto the first area of the intermediate transfer belt on the basis of the mark signal from the standard position generating section in accordance with the image information of the first manuscript document stored in the page memory.

Thereafter, whenever the intermediate transfer belt rotates by one cycle, the transfer control section transfers the Magenta (M) toner image of the first manuscript document and the Yellow (Y) toner image thereof onto the first area of the intermediate transfer belt in this order in accordance with the image information of the first manuscript document. In such manner, the full-color image of the first manuscript document can be formed onto the first area of the intermediate transfer belt.

When the formation of the full-color image of the first manuscript document onto the first area of the intermediate transfer belt is finished, the full-color image of the first manuscript document and the previously formed monochrome image of the second manuscript document are transferred in this order onto the transfer material by use of the secondary transfer unit. When the transferring of the toner image onto the transfer material is finished, the transfer control section issues the commands of exhausting the manuscript document and feeding the next manuscript document to the ADF drive control section by the intermediation of the reading-out drive control section.

In the above-mentioned example (embodiment), the exhausting of the manuscript document is not performed at all until the transferring of the first and second manuscript documents images onto the transfer material is finished. However, since the image information of the first manuscript document is stored in the page memory, the second manuscript document is scanned and it is detected that the second manuscript document is a black-and-white document. At that time, if the command of exhausting the manuscript document is issued at the time of finishing the scanning of the second manuscript document, the exchanging operation of the manuscript document can be performed further rapidly, and further immediately after the full-color image of the first manuscript document is transferred onto the transfer material the next manuscript document can be read out at once.

On the contrary, if the manuscript document is held until the completion of transferring of the image onto the transfer material as mentioned in the embodiment mentioned above, it is not necessary to set again the manuscript document even though the transfer material is jammed on the half way, and therefore the operation of copying can be started again immediately.

Furthermore, in case that the second manuscript document is full-color, the full-color toner image of the first and second manuscript documents is formed on the intermediate transfer belt in accordance with the image information of the first manuscript document stored in the page memory and the image information read out from the second manuscript document, and thereafter, the exchanging of the manuscript document is indicated.

Furthermore, in case that the first manuscript document in black-and-white, the image information read out by scanning the second manuscript document is stored in the page memory in order to keep the information therein, and the first and second manuscript documents are discharged from the image reading out section at the time point of finishing the scanning operation for the second manuscript document, and thereafter the present document is replaced by the next document. In such manner, the exchanging operation of the manuscript document can be done with much more high speed.

Furthermore, in case that, at the same time, two sheets of the manuscript document can be sent, in order, to the manuscript document reading out section and can be read out, even-number sheets of the document are entirely processed by reading out two surfaces thereof. Consequently, for instance, when the state, in which the sheets of the manuscript documents set on the ADF are of odd-number, is inputted from the operating section (operation board), the above-mentioned processing is performed in accordance with the presence (or absence) of the other next manuscript document. Therefore, the image forming sequence can be amplified and the processing speed can be improved.

Furthermore, in case that the image information including two sheets of the document can be stored in the page memory, the image information of the first and second manuscript documents can be kept in the page memory. Even in the case of not forming the electrostatic latent image of the Black (K) image, at the same time, on the photosensitive body at the time of scanning the first manuscript document, the exchanging of the manuscript document can be done rapidly in the similar way as mentioned and thereby the working efficiency at the time of forming the image can be enhanced.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
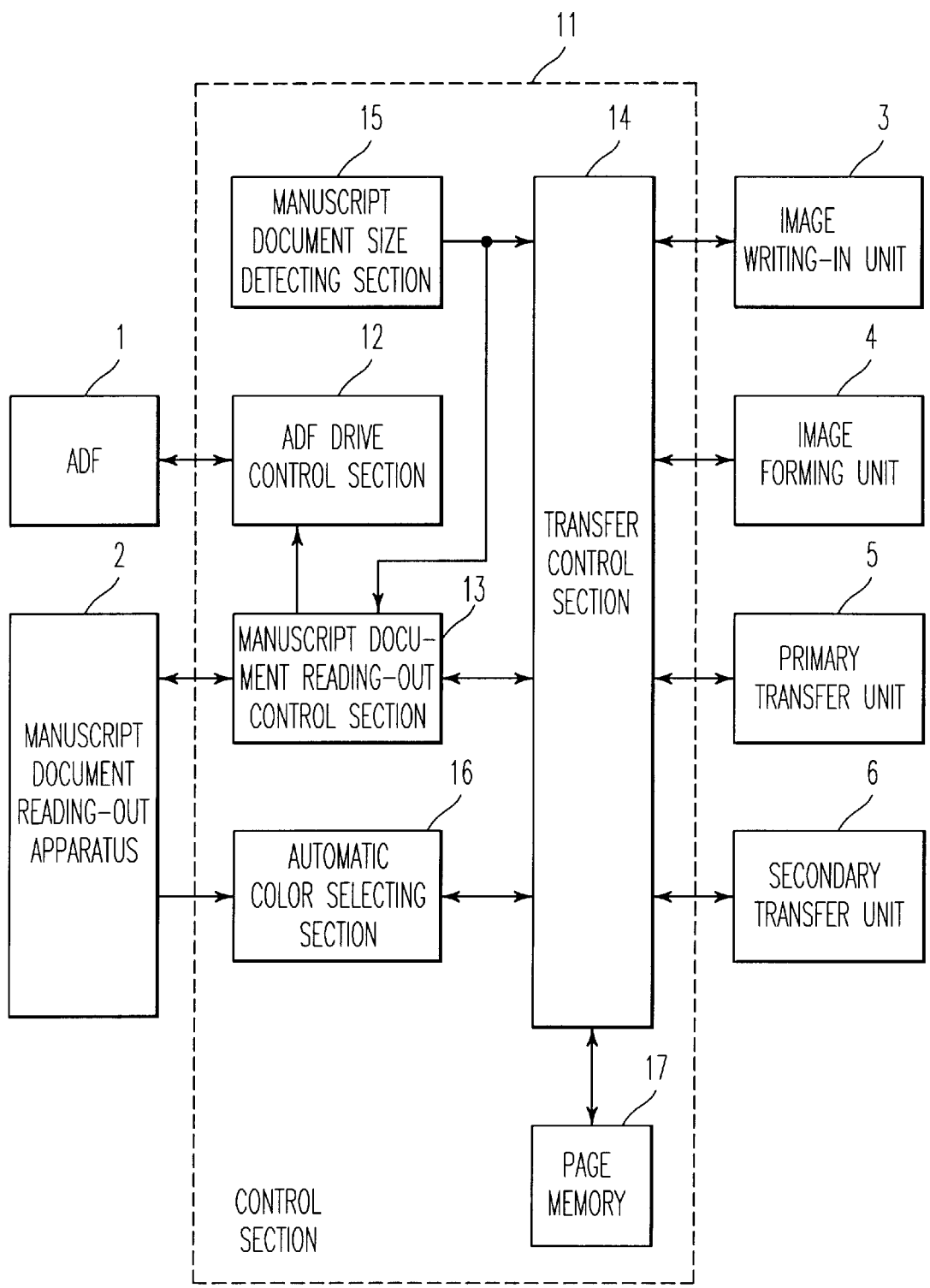
FIG. 1 is a block diagram of the image forming apparatus according to a first embodiment of the present invention.
Figure 6:
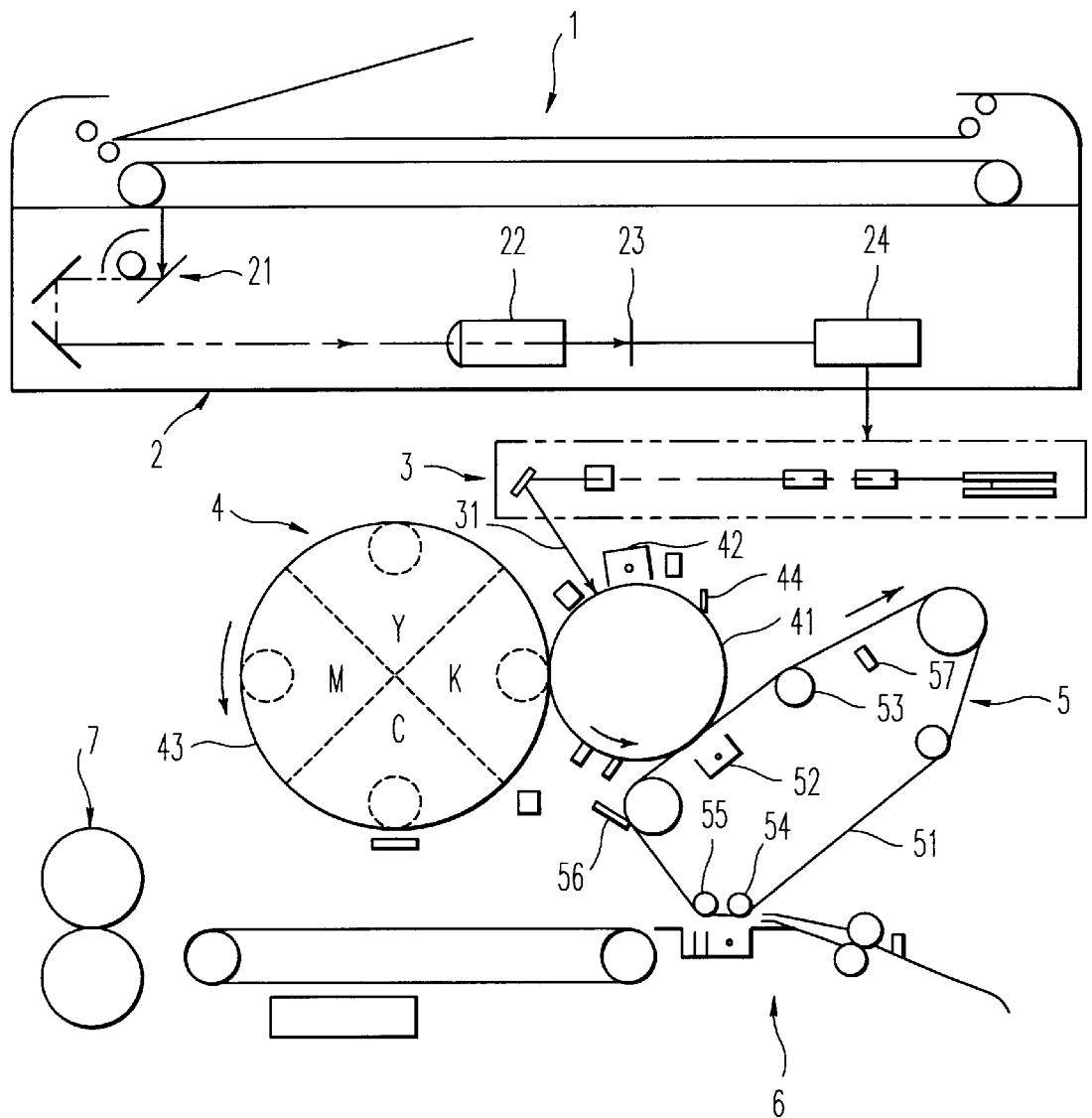
FIG. 6 is a schematic diagram of a digital color copying machine.
Figure 7A:
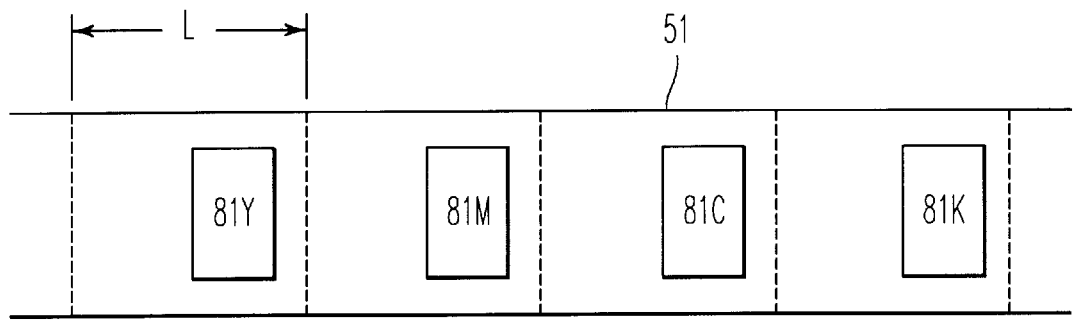
FIGS. 7(a) and 7(b) are explanatory diagrams illustrating a sequential operation at the same time of not using an ADF.
Figure 7B:
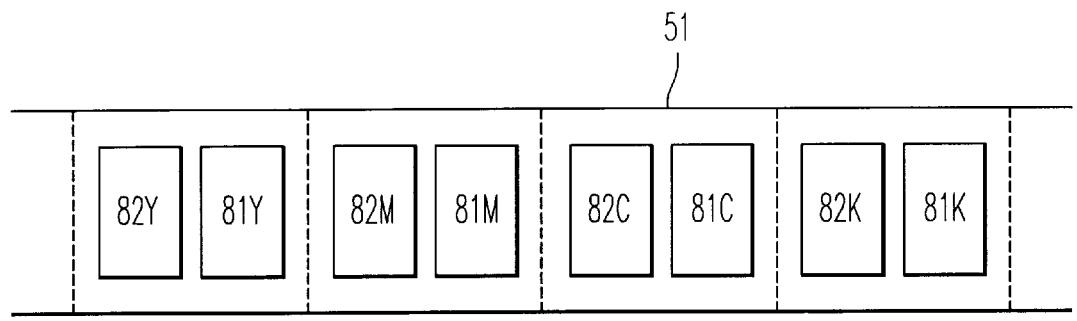

FIG. 1 is a block diagram showing the construction of a digital color copying machine—control section of an embodiment according to the present invention. The digital copying machine of the embodiment may have the same general structure as that of the digital copying machine including an ADF, 1 as shown in FIG. 6. As shown in FIG. 1, the control section 11 of the digital color copying machine is composed of an ADF drive control section 12 for controlling the operation of the ADF 1, a manuscript document reading-out control section 13 for controlling the reading-out operation of the image reading out section 2, an image writing-in unit 3, an image forming unit 4, a transfer control section 14 for controlling the operation of a primary transfer unit 5, and a secondary transfer unit 6 having an intermediate transfer belt 51 for transferring two surfaces of toner image at the same time, a size detecting section 15 for detecting the size of the manuscript document, an automatic color selection section 16, and a page memory 17.

The image reading out section 2 can read out two surfaces of the manuscript document at the same time and can read out the image information of full color only with one-time scanning of the manuscript document. The size detecting section 15 for detecting the size of the manuscript document is mounted on a manuscript document mounting stand (plate) of the ADF 1 and detects the state in which the manuscript document is set on the ADF 1, and the section 15 further detects the size of the document. A sensor for detecting the size of the document during the time period of conveying the document may be provided on the manuscript document carrying path. The automatic color selecting section 16 determines whether the image of the manuscript document read out by the manuscript document reading-out section 2 is black-and-white or full-color, and selects the image forming sequences in accordance with the result of that determination. The page memory 17 stores temporarily only one sheet of the image information read out by the image reading-out section 2. The transfer control section 14 performs the writing-in operation of the image information by exposing the photosensitive body 41 of the image forming unit 4 to the light by use of the image writing-in unit 3 in accordance with the image information of the manuscript document read out by the image reading-out section 2 or the image information stored in the page memory 17.

Figure 2A:
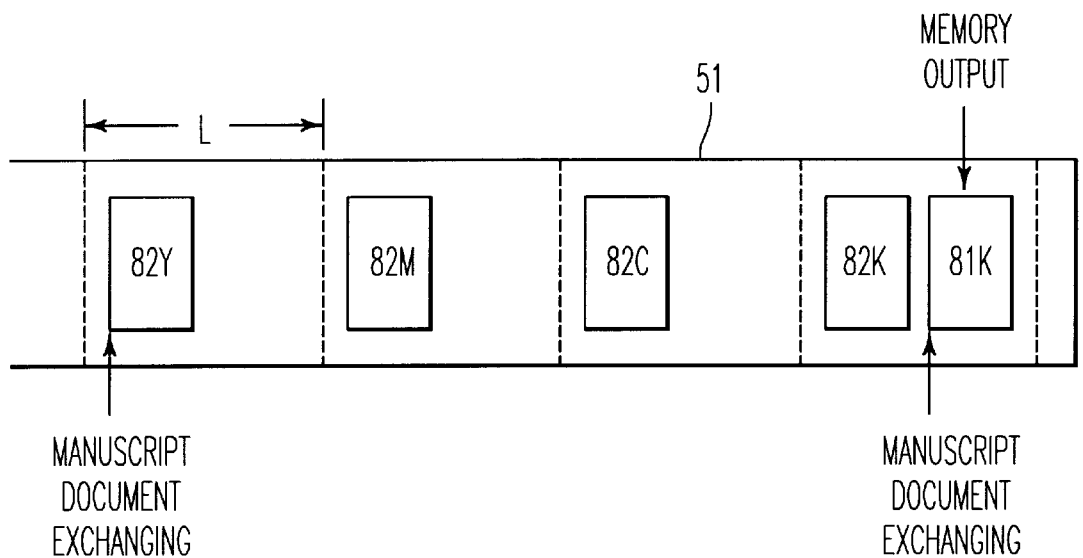
FIGS. 2(a) and 2(b) are explanatory diagrams illustrating a first sequential operation of the first embodiment of the present invention.

The operation of transferring the toner image onto the intermediate transfer belt 51 at the time of sending the black-and-white manuscript document as the first manuscript document from the ADF 1 of the digital color copying machine constructed as mentioned above is explained hereinafter, referring to FIGS. 2(a) and 2(b). In FIG. 2(a), the length L of one circumference of the intermediate transfer belt is represented by the distance between the dashed lines.

Figure 8:
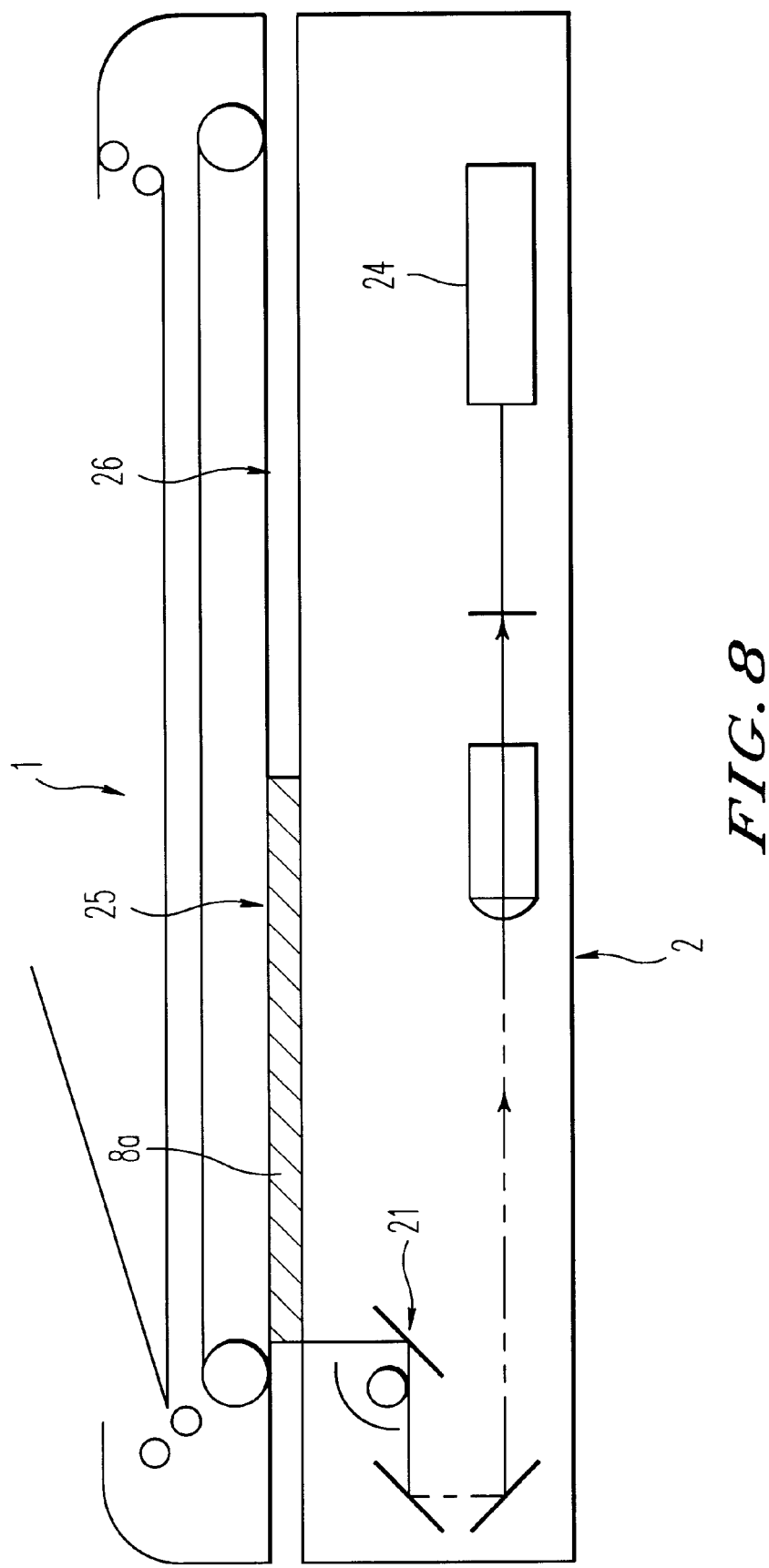
FIG. 8 is a schematic diagram of a digital color copying machine in the state of disposing the manuscript document at the time of reading out a sheet of the manuscript document.

As shown in FIG. 8, when the first manuscript document 8a, which is black-and-white, is sent from the ADF 1 to the first reading-out section 25 at the upstream side of the manuscript document reading out section 2 and set on the first reading-out section 25, the size detecting section 15 for detecting the size of the manuscript document mounted on the ADF 1 sends the manuscript document size detecting signal indicating whether two sheets of the manuscript document 8 can be set on the manuscript document reading-out section 2 and whether the manuscript document 8 is large enough to transfer the images on the two surfaces thereof at the same time onto the intermediate transfer belt 51. Also, the ADF 1 sends another signal indicating the presence or absence of the next manuscript document to the manuscript document reading-out control section 13 and the transfer control section 14 when the first manuscript document 8a is sent from the ADF 1 to the first reading-out section 25.

When the manuscript document reading-out control section 13 receives the signal showing that the manuscript document reading-out control section 13 is large enough to transfer the images on the two surfaces thereof at the same time, the control section 13 drives a carriage 21 of the manuscript document reading-out section 2 by an area of the first reading-out section 2 from the home position. By driving the carriage 21, the manuscript document reading-out section 2 scans the first manuscript document 8a thus being set and reads out the image information. When the manuscript document reading-out section 2 scans the first manuscript document 8a and reads out the image thereon, the automatic color selecting section 16 detects the state in which the first manuscript document 8a is black-and-white and then sends the information indicating whether the first manuscript document 8a is black-and-white to the manuscript document reading-out control section 13 and the transfer control section 14.

The first manuscript document 8a thus being read out is sent to the transfer control section 14 through the intermediation of the manuscript document reading-out control section 13. The transfer control section 14 temporarily stores the image information of the first manuscript document 8a stored in the page memory 17 in order to keep the information therein. The control section causes the respective sections to execute the operations of writing-in, image formation, and transfer processing in accordance with the image information of the first manuscript document 8a stored in the page memory 17.

In the transferring process shown in FIG. 2(a), the Black (K) toner image 81K is transferred onto the first area of the intermediate transfer belt 51 on the basis of the mark signal from the standard position generating section 57.

In such a manner, since the read-out image information is stored when the manuscript document reading-out section 2 finishes the scanning operation for the first manuscript document 8a, the operation of exchanging the manuscript document can be performed immediately after the manuscript document reading-out section 2 finishes the scanning operation for the first manuscript document 8a.

Figure 9:
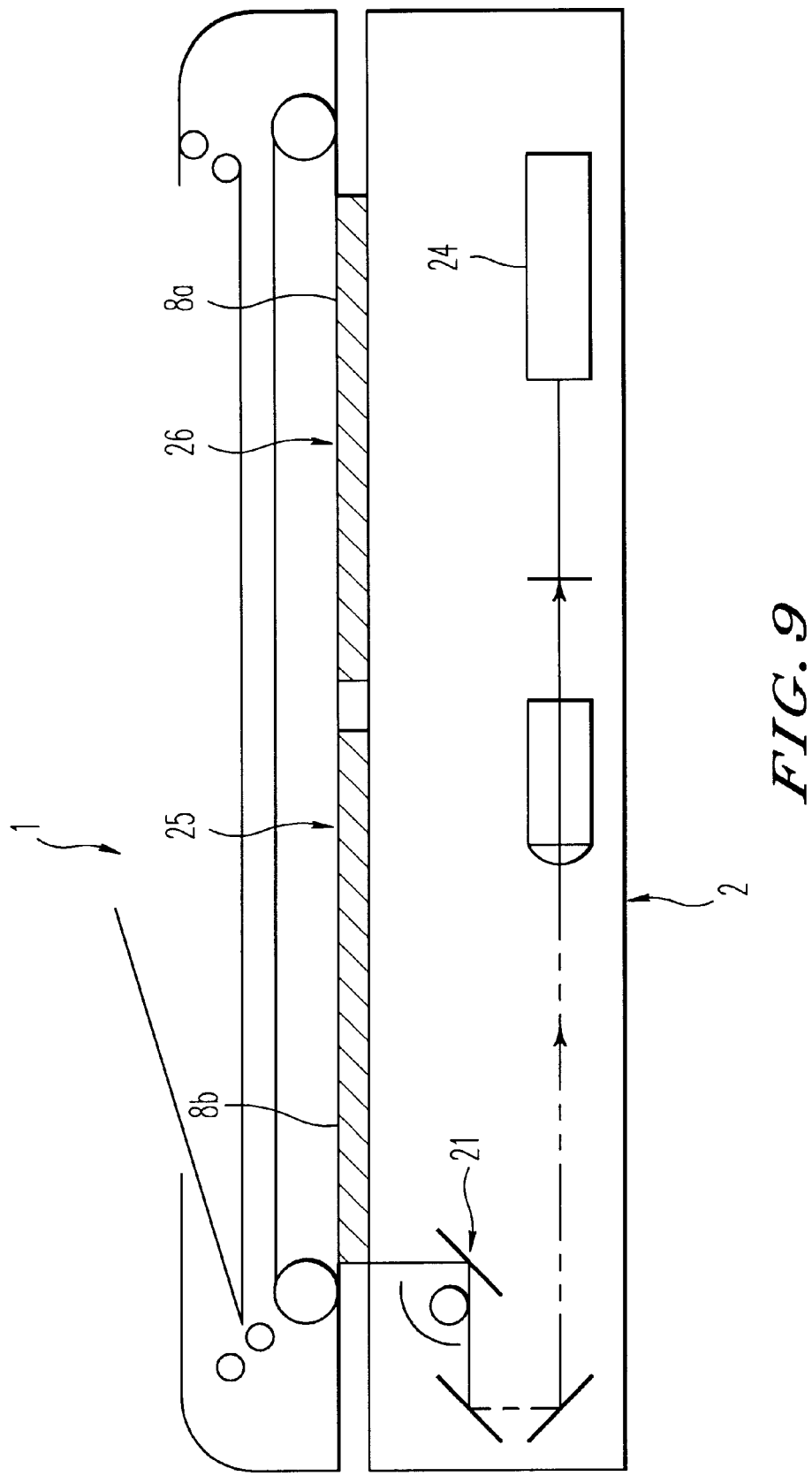
FIG. 9 is a schematic diagram of a digital color copying machine in the state of disposing or arranging the manuscript documents at the time of reading out two sheets of manuscript document.
Figure 10:
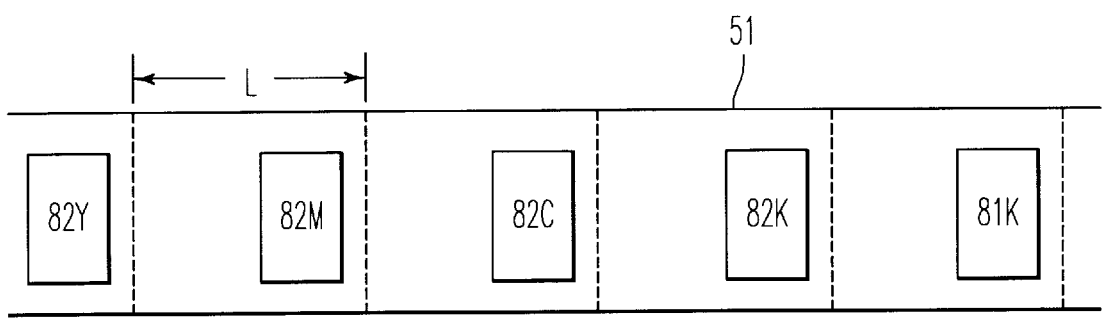
FIG. 10 is an explanatory diagram illustrating a sequential operation of a conventional image forming apparatus at the time of using an ADF.
Figure 11A:
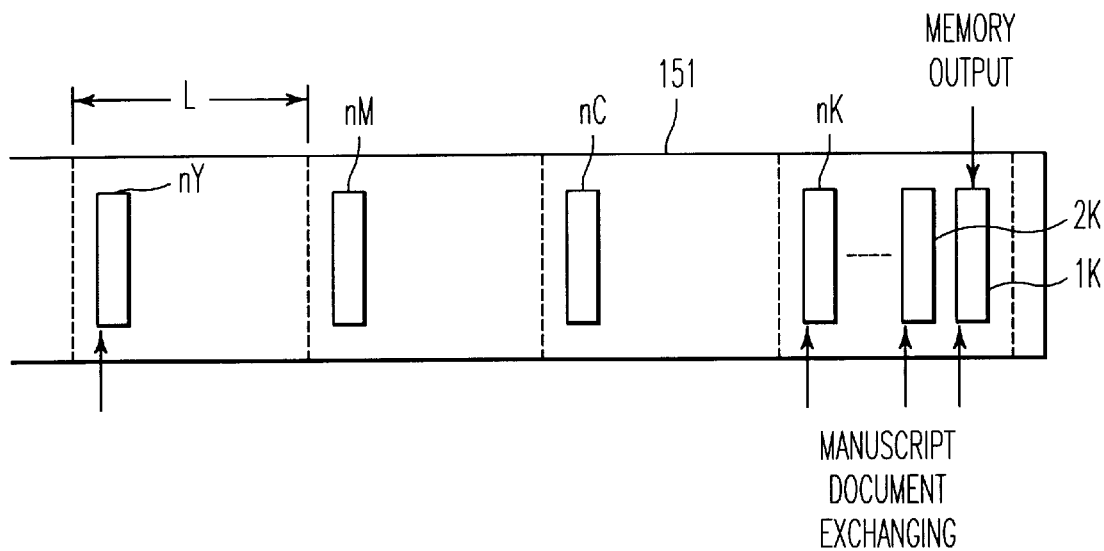
FIGS. 11(a) and 11(b) are explanatory diagrams illustrating another first sequential operation of the first embodiment of the present invention corresponding to FIGS. 2(a) and 2(b)
Figure 11B:
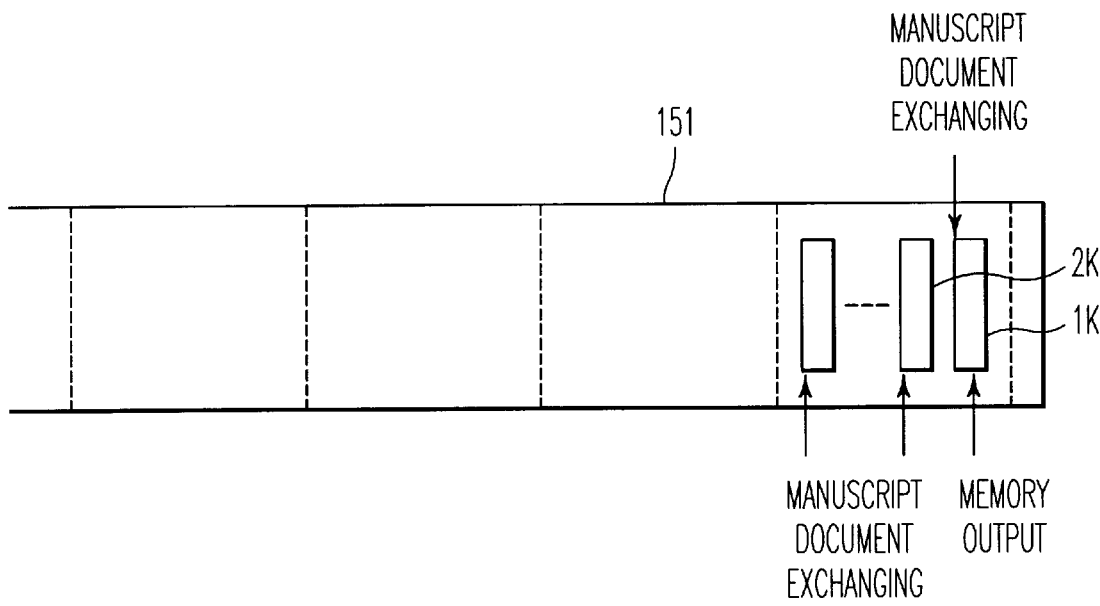
Figure 12A:
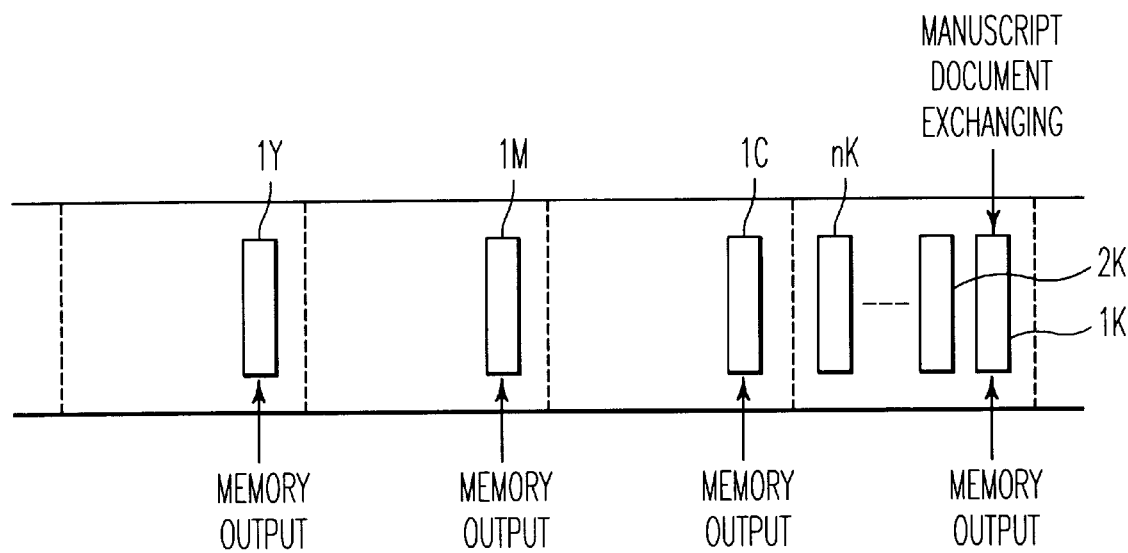
FIGS. 12(a) and 12(b) are explanatory diagrams illustrating another second sequential operation of the first embodiment of the present invention corresponding to FIGS. 3(a) and 3(b)
Figure 12B:
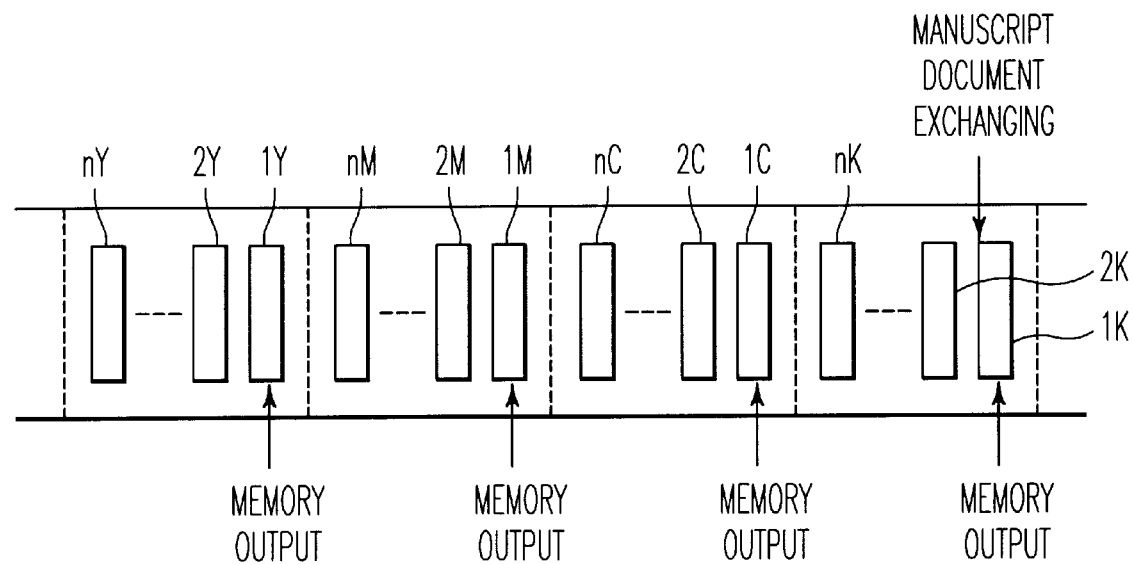
Figure 13:
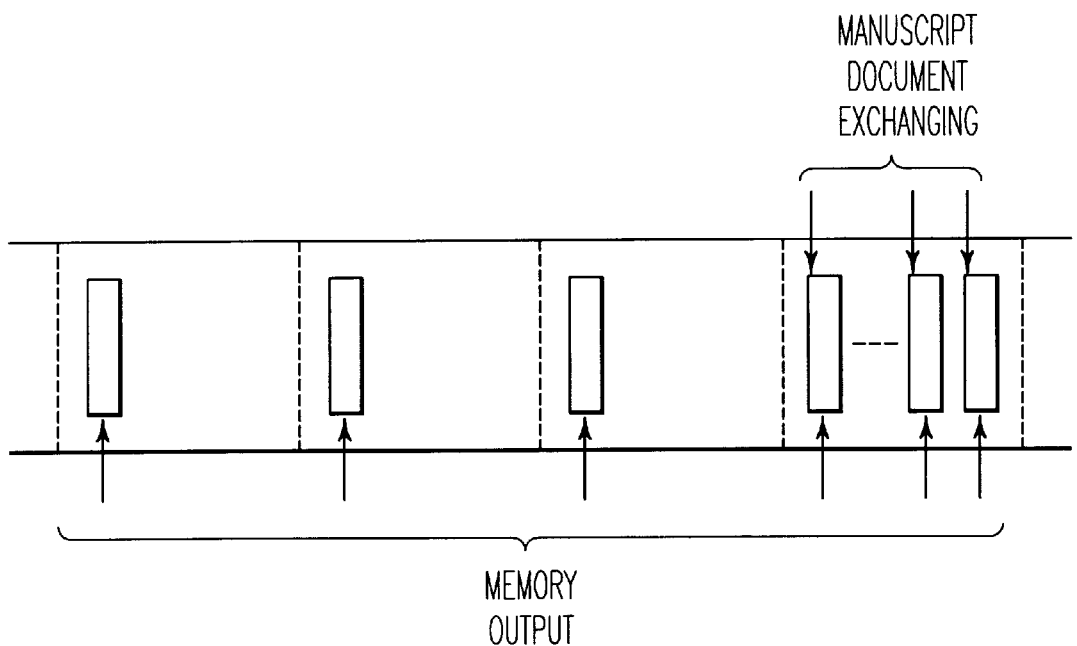
FIG. 13 is an explanatory diagram illustrating another sequential operation of the second embodiment of the present invention corresponding to FIG. 4.
Figure 14:
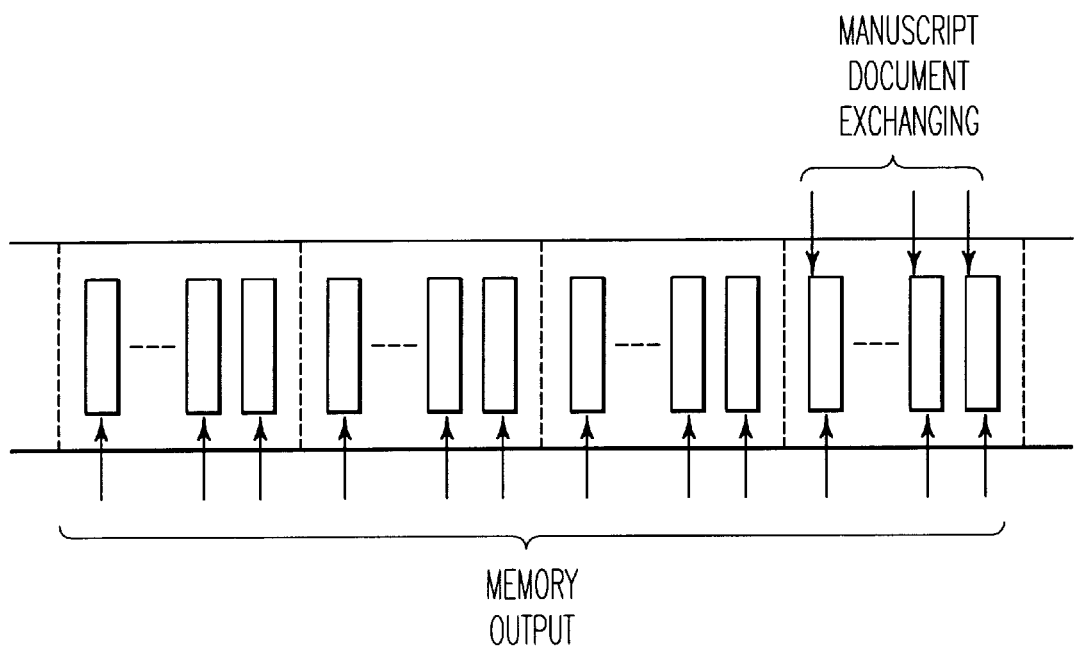
FIG. 14 is an explanatory diagram illustrating another sequential operation of the third embodiment of the present invention corresponding to FIG. 5.
Figure 15A:
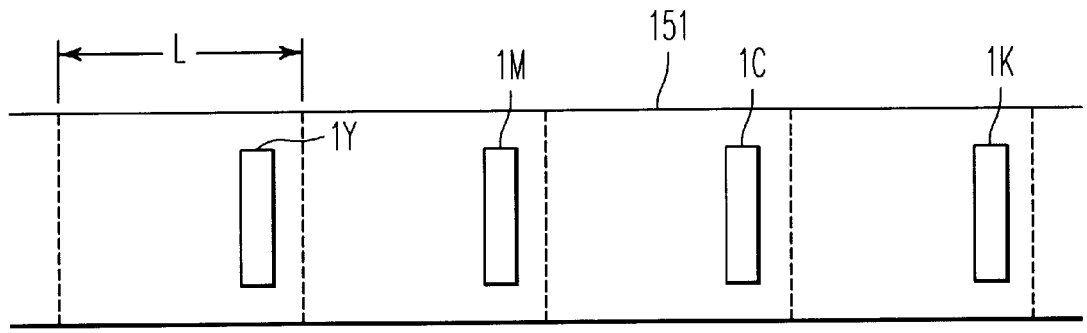
FIGS. 15(a) and 15(b) are explanatory diagrams illustrating another sequential operation at the time of not using an ADF.
Figure 15B:
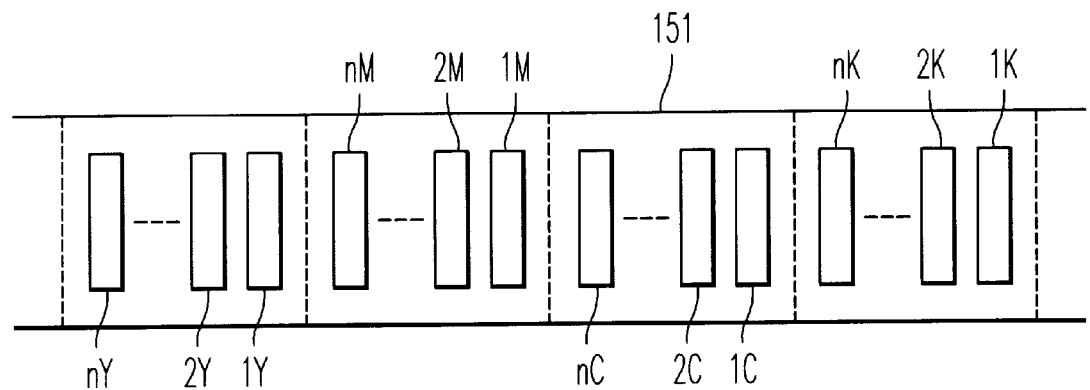

When the manuscript document reading-out control section 13 receives the manuscript document size detecting signal showing that the next manuscript document 8 is set on the ADF 1, and the next manuscript document 8 has a size permitting the transfer of two surfaces of the image at the same time onto the intermediate transfer belt 51, the control section 12 issues the command of exchanging of the manuscript document 8 to the ADF drive control section 12 at the time point when the manuscript document reading-out section 2 finishes the scanning operation for the manuscript document 8a. When the exchanging of the manuscript document is indicated, the ADF drive control section 12 drives the ADF 1, as shown in FIG. 9, the first manuscript document 8a set on the first reading-out position 25 of the manuscript document reading-out section 2 is sent to the second reading-out position 26, and the second manuscript document 8b on the manuscript document mounting stand of the ADF 1 is sent to the first reading-out position 25.

When the second manuscript document 8b is set on the first reading-out position 25, the manuscript document reading-out control section 13 drives the carriage 21 of the manuscript document reading-out section 2 by the area of the first reading-out position 25. By driving the carriage 21, the manuscript document reading-out section 2 scans the second manuscript 8b thus being set. When the manuscript document reading-out section 2 scans the second manuscript document 8b and reads out the image thereon, the automatic color selecting section 16 detects that the second manuscript document 8b is full-color, and then the automatic color selecting section 16 indicates to the manuscript document reading-out control section 13 and to the transfer control section 14 that the full-color image forming sequence should be executed subsequently to the black-and-white image forming sequence.

When the first-time scanning for the second manuscript document 8b is finished, the transfer control section 14 causes the other sections to execute the operations of the writing-in of the image information on the second manuscript document 8b, the image formation, and the transfer process.

In the transfer processing, as shown in FIG. 2(a), the Black (K) toner image 81K of the first manuscript document 8a is transferred onto the first area of the intermediate transfer belt 51, while the Black (K) toner image 82K of the second manuscript document 8b is transferred onto the second area of the intermediate transfer belt 51. Next, the processing enters, in order, the second and subsequent scannings of the second manuscript document 8b, the writing-in of the image information, the image formation, and the transfer processing.

When the processing enters the second and subsequent scannings of the second manuscript document 8b, the manuscript document reading-out control section 13 causes the manuscript document reading out apparatus 2 to scan only the first reading-out position 25 on which the second manuscript document 8b is set. The Cyan (C) toner image 82C of the second manuscript document 8b is transferred onto the second area of the intermediate transfer belt 51 rotating by one cycle on the basis of the mark signal from the standard position generating section 57. At this time, the first area onto which the Black (K) toner image of the first manuscript document has been transferred is blind-forwarded.

The processings described above are also repeated for the toner image 82M of Magenta (M) and for the toner image 82Y of Yellow (Y), and thereby the full-color image of the second manuscript document 8b is formed on the intermediate transfer belt 51. Finally, the monochrome image of the first manuscript document on which the image has previously been formed and the full-color image of the second manuscript document are transferred, in this order, onto the transfer materials by use of the secondary transfer belt. Then, the manuscript document reading-out control section 13 commands the ADF driving control section 12 to replace the first manuscript document 8a by the second manuscript document at the time point of finishing the fourth scanning of the second manuscript document 8b in the manuscript document reading-out apparatus 2. The ADF 1 withdraws the first and second manuscript documents 8a and 8b in accordance with the above indication, and sends the next manuscript document to the first reading-out portion 25 of the manuscript document reading-out section 2.

Figure 2B:
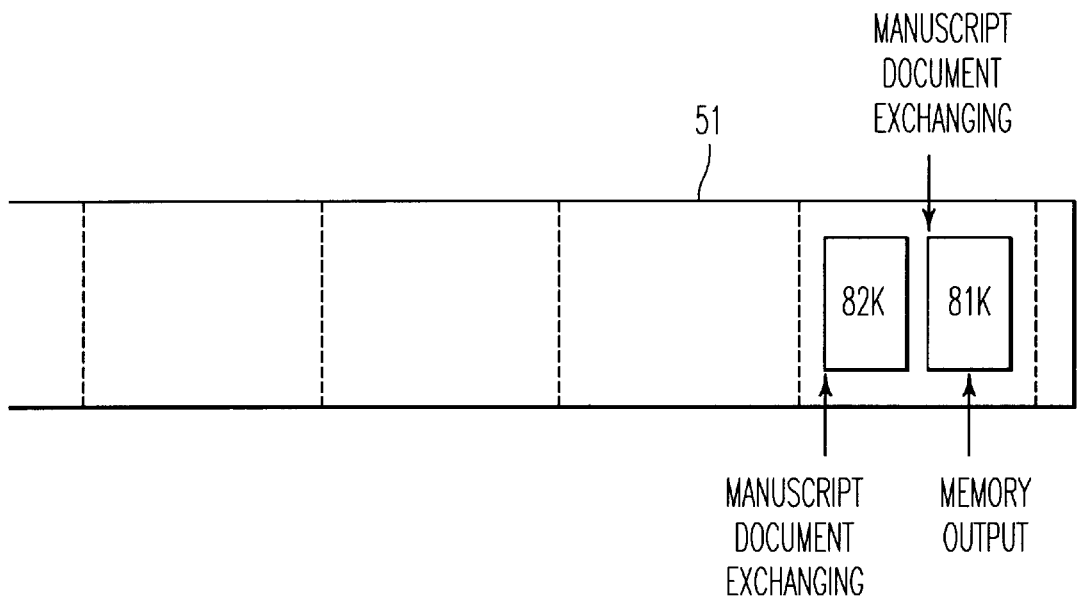

Furthermore, if the second manuscript document 8b sent to the first reading-out portion 25 is black-and-white, as shown in FIG. 2(b), the manuscript document reading-out control section 13 commands the ADF 1 to replace the first manuscript document by the second manuscript document at the time point of finishing the first-time scanning for the second manuscript document 8b in the manuscript document reading-out section 2, withdraws the first and second manuscript documents 8a and 8b, and sends the next manuscript document to the first reading-out position 25 of the manuscript document reading-out section 2. Thereafter, the above-mentioned processings are repeated until no manuscript document exists on the manuscript document mounting stand of the ADF 1.

Next, if a full-color manuscript document is sent as the first manuscript document 8a from the ADF 1 on which plural manuscript documents 8 having a size that permits the transfer of two surfaces at the same time is set, the operation of transferring the toner image onto the intermediate transfer belt 51 is explained hereinafter, referring to FIG. 3.

As shown in FIG. 8, the first full-color manuscript document 8a is sent to the first reading-out position 25 at the upstream side of the manuscript document reading-out section 2 from the ADF 1, and set thereon. When the first manuscript document 8a is scanned and read out in the manuscript document reading-out section 2, the automatic color selecting section 16 detects that the first manuscript document 8a is full-color, and then the automatic color selecting section 16 sends the above information to the manuscript document reading-out control section 13 and to the transfer control section 14. The first manuscript document 8a read out by the manuscript document 2 is sent to the transfer control section 14 through the intermediation of the manuscript document reading-out control section 13.

The transfer control section 14 temporarily stores the full-color image information of the first manuscript document 8a thus being sent in the page memory 17 in order to keep the information therein. The operation of writing-in the image formation and transferring process are executed in accordance with the image information of the first manuscript document 8a stored in the page memory 17. In the transfer process, as shown in FIG. 3(a), the Black (K) toner image 81K is transferred onto the first area of the intermediate transfer belt 51 on the basis of the mark signal from the standard position generating section 57.

The manuscript document reading-out control section 13 issues a command of exchanging the manuscript document 8 to the ADF drive control section 12 at the time point of finishing the scanning operation for the first manuscript document 8a in the manuscript document reading-out section 2. When the exchanging of the manuscript document is indicated (ordered) to the ADF drive control section 12, the section 12 drives the ADF 1, and sends the first manuscript document 8a thus being set on the first reading-out position 25 of the manuscript reading-out section 2 to the second reading-out position 26 and further sends the second manuscript document 8b mounted on the manuscript document mounting stand (plate) to the first reading-out position 25, as shown in FIG. 9.

When the second manuscript document 8b is set on the first reading-out position 25, the manuscript document reading-out control section 13 drives the carriage 21 of the manuscript document reading-out section 2 and thereby scans the second manuscript document 8b. When the second manuscript document 8b is scanned and read out with the manuscript document reading-out section 2, the automatic color selecting section 16 detects the second manuscript document 8b is black-and-white and indicates the matter to the manuscript document reading-out control section 13 and the transfer control section 14. When the scanning operation for the second manuscript document 8b is finished, the transfer control section 14 causes the other elements to execute the operations of the writing-in of the image information, the image formation, and the transfer processing.

Figure 3A:
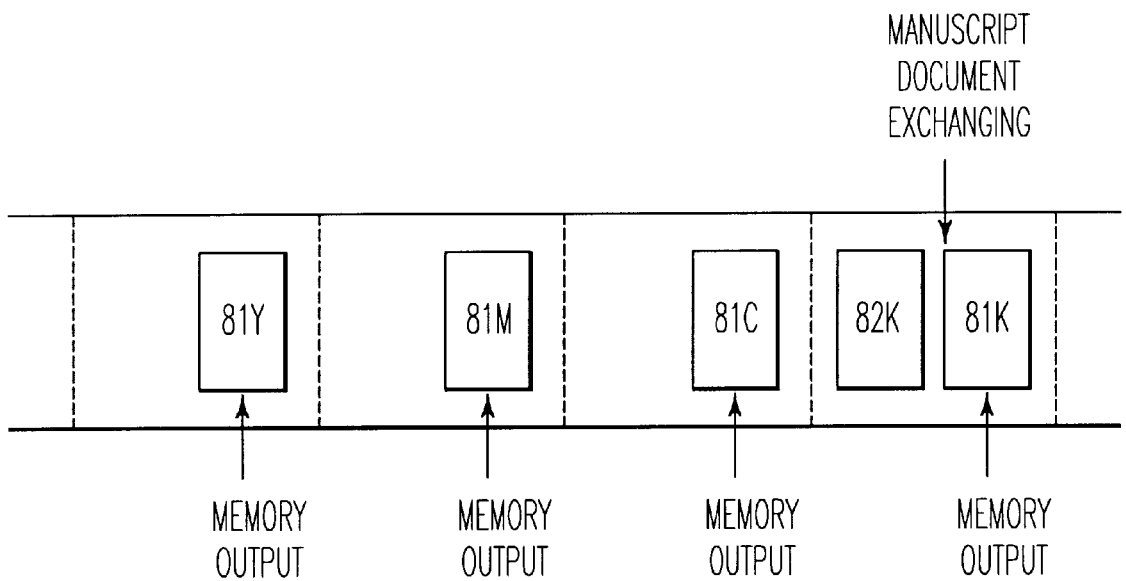
FIGS. 3(a) and 3(b) are explanatory diagrams illustrating a second sequential operation of the first embodiment of the present invention.

During transfer processing, as shown in FIG. 3(a), the Black (K) toner image 81K of the first manuscript document 8a is transferred onto the first area of the transfer belt 51, while the Black (K) toner image 82K of the second manuscript document 8b is transferred onto the second area of the transfer belt 51.

When the intermediate transfer belt 51 rotate by one cycle, the transfer control section 14 transfers the Cyan (C) toner image 81C of the first manuscript document 8a onto the first area of the intermediate of the transfer belt 51 on the basis of the mark signal from the standard position generating section 57 in accordance with the image information of the first manuscript document 8a stored in the page memory 17, and the second area onto which the Black (K) toner image of the second manuscript document has been transferred is blindforwarded.

Such processings as described above are also repeated for the toner image 81M of Magenta (M) and for the toner image 81Y of Yellow (Y). In this manner, the full-color image of the first manuscript document 8a is formed on the intermediate transfer belt 51. Finally, the full-color image thus formed of the first manuscript document and the monochrome image of the second manuscript document on which the image has previously been formed are transferred, in this order, onto the transfer materials by use of the secondary transfer unit.

The transfer control section 14 finishes such image forming process and then informs the reading-out drive controls section 13 of finishing the process. The manuscript document control section 13 issues a command of exchanging the manuscript document 8 to the ADF drive control section 12.

In the above-mentioned example, the exhausting of the manuscript document is not performed at all until the transfer of the first and second manuscript documents images onto the transfer material is finished.

However, since the image information of the first manuscript document 8a is stored in the page memory 17, the second manuscript document 8b is scanned and it is detected that the second manuscript document 8b is a black-and-white document. At that time, if the command of exchanging of the manuscript document is issued at the time of finishing the scanning of the second manuscript document 8b, the exchanging operation of the manuscript document can be performed further rapidly, and further, immediately after the full-color image of the first manuscript document 8a is transferred onto the transfer material, the next manuscript document can be read out at once.

On the contrary, if the manuscript document 8b is held until the completion of transferring of the image onto the transfer material as mentioned in the above embodiment, it is not necessary to set again the manuscript document even if the transfer material is jammed while only half way conveyed, and therefore the operation of the copying can be started again immediately.

Furthermore, when the second manuscript document 8b is scanned and read out by the manuscript document reading-out section 2, the automatic color selecting section 16 detects that the second manuscript document 8b is full-color, selects the full-color image forming sequence as the processing for the second manuscript document 8b, and indicates the matter to the manuscript document reading-out control section 13 and to the transfer control section 14.

Figure 3B:
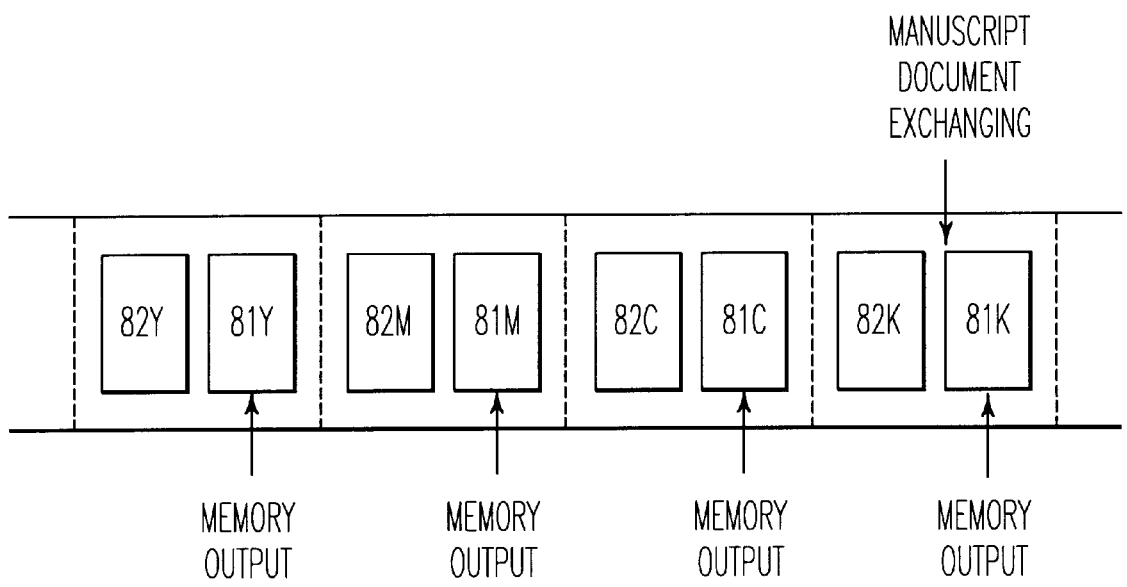

As shown in FIG. 3(b), whenever the intermediate transfer belt 51 rotates by one cycle, the transferring operation for the image information of the first manuscript document 8a stored in the page memory 17 and the other transferring operation for the image information read out by scanning the second manuscript document 8b by use of the manuscript document reading out apparatus 2 are alternately performed for each of the respective colors.

Thereby, the full-color image of the first manuscript document 8a can be formed on the first area of the intermediate transfer belt 51, and the full-color image of the second manuscript document 8b can be formed on the second area thereof.

Namely, after forming the Black (K) toner image 81K of the first manuscript document 8a on the first area of the intermediate transfer belt 51, the second manuscript document 8b is scanned and the Black (K) toner image 82K of the second manuscript document 8b is formed on the second area of the intermediate transfer belt 51. Subsequently, when the intermediate transfer belt 51 rotates by one cycle, the Cyan (C) toner image 81C is formed on the first area of the intermediate transfer belt 51 in accordance with the image information of the first manuscript document 8a read out from the page memory 17 on the basis of the mark signal from the standard position generation section 57. Thereafter, the Cyan (C) toner image 82C of the image information read out by scanning the second manuscript document 8b by use of the manuscript document reading-out apparatus 2 is formed on the second area of the intermediate transfer belt 51.

By repeating the same operation as mentioned above for Magenta (M) and for Yellow (Y), the full-color toner image of the first document 8a can be formed on the first area of the intermediate transfer belt 51, and the full-color toner image of the second document 8b can be formed on the second area thereof. After the respective full-color toner images are transferred in order onto the transfer material, the exchanging of the manuscript document 8 is ordered and then the process enters the treatment for the next manuscript document 8 in the similar way as mentioned heretofore.

Heretofore, the above embodiment has been explained for the case in which the image information of the manuscript document 8a is stored in the page memory 17 so as to keep the information therein.

In case the first manuscript document 8a is black-and-white and the second manuscript document 8b is full-color, when the Black (K) toner image 82K of the second manuscript document 8b thus read out is transferred onto the intermediate transfer belt 51, it is not necessary to store the image information of the first manuscript document 8a in the page memory 17. In such a situation, when the first manuscript document 8a (black-and-white) is read out and thereafter, the first manuscript document 8a is replaced by the second manuscript document 8b and the document 8b is read out. The image information of the second manuscript document 8b thus read out is stored in the page memory 17.

Figure 4:
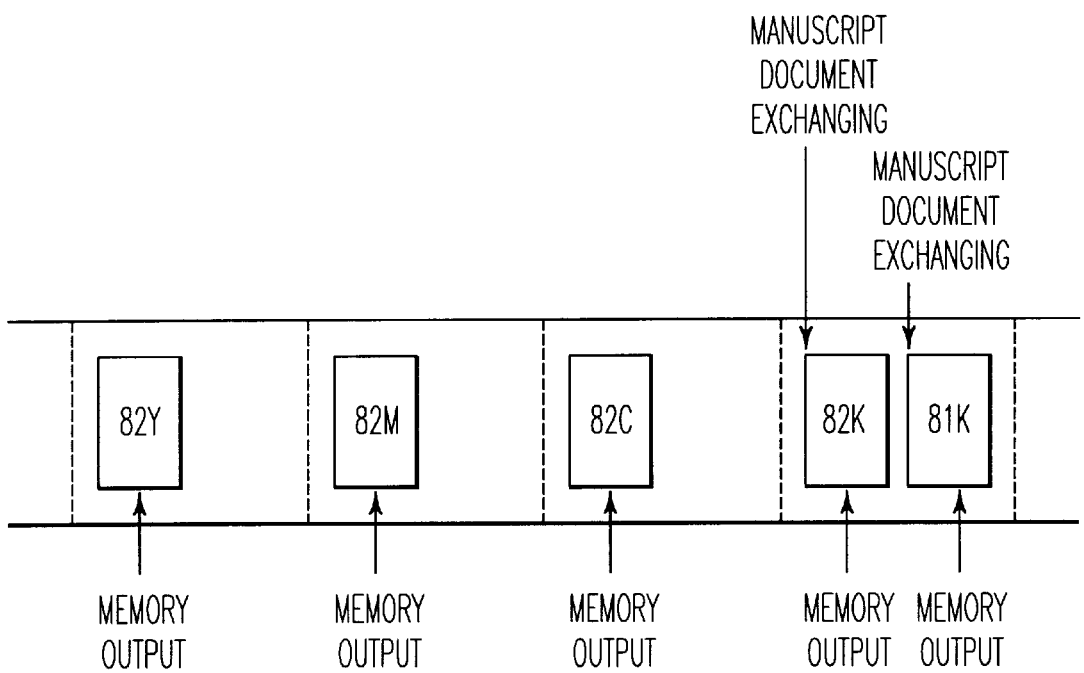
FIG. 4 is an explanatory diagram illustrating a sequential operation of the second embodiment of the present invention.

As shown in FIG. 4, it may be also allowed that the toner images 82K, 82C, 82M and 82Y of the second manuscript document 8b are formed in accordance with the image information stored in the page memory 17. In such manner, when the second manuscript document 8b is read out, the exchanging of the manuscript document can be indicated immediately thereafter.

Furthermore, as to the above-mentioned respective embodiments, the case of feeding the manuscript document 8 sheet by sheet from the ADF 1 to the manuscript document reading section 2 has been explained, heretofore. However, assuming that the manuscript documents 8a and 8b (two sheets) can be sent at the same time in order from the ADF 1 to the manuscript document reading-out section 2 and thereby the operation of reading out the respective surfaces of the documents turns out to be possible, in case that the state in which the number of the manuscript document 8 set on the ADF 1 is odd is inputted, for instance, from the operating section (operating board), it may be also allowed that the above-mentioned processings are performed in accordance with the presence or absence of the other next manuscript document, at the time of performing the scanning operation for the last manuscript document 8. Namely, if the reading-out operation for the two surfaces can be performed at the same time, even-number sheets of the manuscript document 8 turn out to be entirely processed with the two-surfaces reading out operation.

Furthermore, as to the above-mentioned embodiment, the case of storing and keeping the image information in one sheet of the manuscript document in the page memory 17 has been explained, heretofore. However, assuming that the image information corresponding to the two sheets of manuscript document can be stored in the page memory 17, the image information of the first and second manuscript documents can be stored and kept in the page memory 17.

Figure 5:
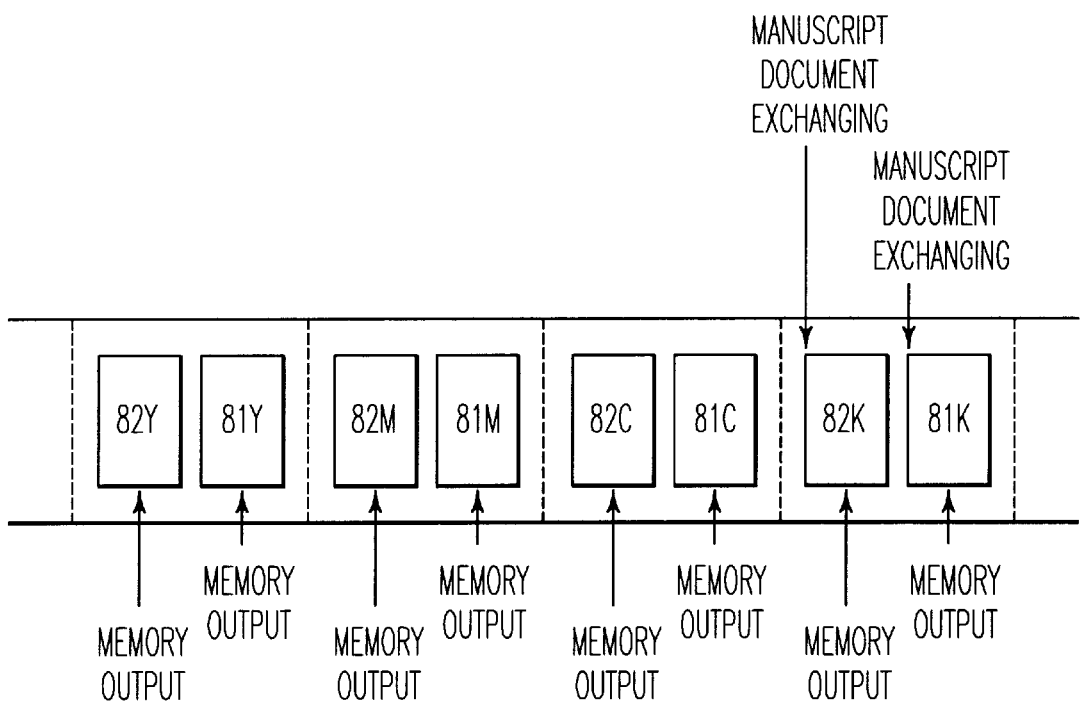
FIG. 5 is an explanatory diagram illustrating a sequential operation of the third embodiment of the present invention.

Even in the case of not forming the Black (K) electrostatic latent image at the same time on the photosensitive body 41 when the first manuscript document 8a is scanned, the exchanging of the manuscript document can be performed promptly in the same manner as described above, and thereby the working efficiency for the image forming can be further enhanced. On this occasion, as shown in FIG. 5, it may be also allowed that the toner images 81K, 81C, 81M, and 81Y of the first manuscript document 8a and the other tone images 82K, 82C, 82M, and 82Y of the second manuscript document 8b are transferred in order into the intermediate transfer belt 51 in accordance with the image information. Moreover, in the aforementioned embodiment, the ADF 1 has a first reading-out position and a second reading-out position. When the operation of reading out the manuscript document at the first reading-out position is finished, the document is sent to the second reading out position. However, the ADF 1 may also have only one reading-out position, and when the operation of reading out the manuscript document at the reading-out position is finished, the document is discharged outside of the image forming apparatus.

Furthermore, although the image formation with the first color is performed on the basis of the data read out from the page memory 17 in the aforementioned embodiment, the manuscript document image data read out by the image reading-out apparatus 2 may be sent to both of the page memory 17 and the image writing-in unit 3; in this case, the operation of storing the data into the page memory 17 and that of writing in the data into the image writing-in unit 3 are performed at the same time.

Furthermore, although the developing unit is a rotating-type one which rotates by 90° in order for the respective development colors—Black (K), Cyan (C), Magenta (M), and Yellow (Y)—so as to cause the next color developing section to oppose to the photosensitive body, a fixing-type developing unit may alternatively be employed in which the respective developing sections for those developing colors are fixedly arranged around the surface of the photosensitive body.

According to the present invention, even though the color manuscript document image and the monochrome manuscript document image mixedly exist in the two sheets of paper (on two pages), it is possible to form both images at the same time on the intermediate transfer member. Furthermore, since the image information of the first manuscript document 8a can be firstly memorized in the memory and then the second manuscript document 8b can be fed at the time point of finishing the scanning of the first manuscript document 8a, the speed of forming the image increases.

Since the image information of the first manuscript document 8a is read out from the memorizing medium and then the image information of the second manuscript document 8b is read out from the image reading-out medium, and the image is formed at the same time, the memorizing capacity of the one-sheet document is sufficient for the image formation and thereby the cost-down can be realized.

In case that the second manuscript document 8b is monochrome, since the second manuscript document 8b can be discharged immediately after finishing the image formation of the second manuscript document 8b with the first color (black), and the next manuscript document can be fed into the reading-out position during the time period of forming the image of the first manuscript document 8a, and further the reading-out of the next manuscript document can be started immediately after finishing the image formation of the first manuscript document 8a, the speed of forming the image can be largely improved.

Since the second manuscript document 8b is held on the reading-out position until finishing the image formation of the first manuscript document 8a, even though the paper jamming occurs in the midst of conveying the transfer paper, the second manuscript document 8b does not need to be set again, and thereby the easiness of operation can be improved. On the other hand, since the image information of the first manuscript document 8a is memorized in the memorizing medium, the first manuscript document 8a does not also need to be set again.

In the case that the first manuscript document 8a is monochrome, since the image information of the second manuscript document 8b is memorized in the memorizing medium, it may be sufficient to read out only one time both of the first and second manuscript document 8bs by use of the image reading-out medium and the speed of forming the image can be improved. Furthermore, since the image of the first manuscript document 8a is not memorized therein, the memorizing capacity of the memorizing medium of one sheet of the document may be sufficient for the image formation. Thus, cost can be reduced.

Since the second manuscript document 8b is discharged at the time point of memorizing the image data of the second manuscript document, and further since the next manuscript document can be fed onto the reading-out position during the image formation and the reading-out of the next manuscript document can be started immediately after finishing the image formation of the manuscript document, the speed of forming the image can be improved.

Since the information of the first and second manuscript document 8b is memorized in the memorizing medium, the manuscript document can be replaced rapidly and the speed of forming the image can be improved.

As described above, the first manuscript document 8a is sent onto the first reading-out position 25 at the upstream side of the manuscript document reading-out section 2 and set thereon. When the manuscript document reading-out section 2 scans and reads out the first manuscript document 8a, the reading-out section 2 temporarily stores the image information of the first manuscript document 8a in the page memory 17. Furthermore, the manuscript document reading-out section 2 indicates the exchanging of the manuscript document at the time point of finishing the scanning operation for the first manuscript document 8a, sends the first document set on the first reading-out position 25 of the manuscript document reading-out section 2 to the second reading-out position 26 located at the downstream side, and further sends the second manuscript document 8b mounted on the ADF manuscript document mounting stand (plate) onto the first reading-out portion. Consequently, the exchanging operation for the manuscript document can be done promptly. Thereby, the working efficiency at the time of forming the image by use of the ADF.

Furthermore, since the image information of the first manuscript document 8a is stored in the page memory 17, when the state in which the second manuscript document 8b is black-and-white is detected, the exchanging operation for the manuscript document can be done at the time point of finishing the scanning operation for the second manuscript document 8b, and thereby the exchanging of the next manuscript document can be carried out more rapidly.

Furthermore, when the first manuscript document 8a is black-and-white, the image information read out by scanning the second manuscript document 8b is stored in the page memory 17 and kept therein. Consequently, at the time point of finishing the scanning for the second manuscript document 8b, the first and second manuscript documents are discharged from the image reading-out apparatus and replaced by the next manuscript document(s). Thereby, the manuscript document can be exchanged further promptly.

Moreover, in case that two sheets of the manuscript document can be fed in order at the same time from the ADF to the manuscript document reading-out apparatus, and then two surfaces can be read out, the manuscript documents of plural number are entirely processed with the two-surfaces reading-out operation. Consequently, when the state in which the number of the manuscript documents set on the ADF is odd is inputted, for instance, by the operating portion (operational panel), if the above-mentioned processing is performed at the time of scanning the last manuscript document in accordance with the presence or absence of the other next manuscript document, the image forming sequence can be simplified and the processing speed can be improved (increased).

Furthermore, if the page memory 17 has a spare space for storing the image information corresponding to the two sheets of image information in the page memory 17, the image information of the first and second manuscript documents can be stored in the page memory 17 and kept therein.

Even in the case of not forming the Black (K) electrostatic latent image at the same time on the photosensitive body at the time of scanning the first manuscript document 8a, the exchanging of the manuscript document can be performed promptly in the same manner as the above-mentioned, and thereby the working efficiency for the image forming can be further enhanced.

Although the embodiments according to the present invention is described heretofore, the invention is not limited to those embodiments.

As an example, it is not always necessary to limit the number of the image surfaces to be formed so as to arrange only two images on the intermediate transfer member. According to the present invention, it is possible to set the number of image surfaces to 3, 4, 5, . . . n, as shown in FIGS. 11(a), 11(b), 12(a), 12(b), 13, 14, 15(a), and 15(b).

This application is based upon Japanese Patent Application No. 9-149956 (filed on May 26, 1997) and upon Japanese Application No. 10-137921 (filed on May 20, 1998), both of which are incorporated herein by reference in their entirety.

Obviously, numerous embodiments and modifications and variations of the present invention are possible in light of the above teachings. It is therefore to be understood that within the scope of the appended claims, the invention may be practiced otherwise than as specifically described herein.

I claim:

1. An image forming apparatus, comprising:
   an image reading-out unit configured to read out image data of a manuscript document image corresponding to a surface of a first manuscript document by optically scanning the first manuscript document;
   an automatic manuscript document conveying unit configured to automatically convey the first manuscript document to said image reading-out unit;
   a latent image carrier configured to carry an electrostatic latent image of the manuscript document image read out by said image reading-out unit;
   a developing unit configured to develop the electrostatic latent image carried on said latent image carrier by converting the electrostatic latent image to a toner image;
   an intermediate transfer member on which a plural color image is formed, said intermediate transfer member being configured to transfer the toner image developed by said developing unit onto said transfer member and hold the toner image and at least one additional toner image on said transfer member;
   a judgment unit configured to judge whether the manuscript document image of the first manuscript document is monochrome or color;
   a memorizing unit configured to memorize the image data read out by said image reading-out unit; and
   a control unit configured to, in case that the first manuscript document is judged to be a color document by said judgment unit, control the image forming apparatus such that
   said memorizing unit memorizes the image data read out by said image reading-out unit and the toner image is formed with a first color on a first area of said intermediate transfer member at the same time,
   a second manuscript document is conveyed with said document conveying unit,
   the additional toner image is formed with the first color on a second area of said intermediate transfer member, and
   the toner image is formed with a second and subsequent colors of said first manuscript document on the first area on the basis of the image data read out from said memorizing unit.

2. The image forming apparatus of claim 1, wherein, in case that the second manuscript document is judged to be a color document by said judgment unit, the toner image of the second and subsequent colors is formed on the second area by scanning the second manuscript document plural times with said image reading-out unit.

3. The image forming apparatus of claim 1, wherein, in case that the second manuscript document is judged to be a monochrome document by said judgment unit, after finishing the image formation with the first color on the second area, the second manuscript document is exhausted from the image forming apparatus.

4. The image forming apparatus of claim 1, wherein, in case that the second manuscript document is judged to be a monochrome document by said judgment unit, the second manuscript document is held on the reading-out unit until the formation of the plural color image on the first area is complete.

5. An image forming apparatus, comprising:
   an image reading-out unit configured to read out image data of a manuscript document image of a first manuscript document automatically conveyed to said image reading out unit;
   an automatic manuscript document conveying unit configured to automatically convey the first manuscript document to said image reading-out unit;
   a latent image carrier configured to carry an electrostatic latent image of the manuscript document image read out by said image reading-out unit;

a developing unit configured to develop the electrostatic latent image carried on said latent image carrier by converting the electrostatic latent image to a toner image;

an intermediate transfer member on which a plural color image is formed, said intermediate transfer member being configured to transfer the toner image developed by said developing unit onto said transfer member and hold the toner image and at least one additional toner image thereon;

a judgment unit configured to judge whether the manuscript document image of the first manuscript document is monochrome or color;

a memorizing unit configured to memorize the image data read out by said image reading-out unit; and a control unit configured to, in case that the first manuscript document is judged to be a monochrome document by said judgment unit, control the image forming apparatus such that said memorizing unit memorizes the image data read out by said image reading-out unit and the toner image is formed with a first color on a first area of said intermediate transfer member at the same time, a second manuscript document is conveyed with said document conveying unit, the additional toner image is formed with the first color on a second area of said intermediate transfer member, and the additional toner image is formed with a second and subsequent colors on the second area by scanning the second manuscript document with the image reading-out unit in case that the second manuscript document is judged to be a color document by said judgment unit.

6. The image forming apparatus of claim 5, wherein said memorizing unit stores the memorized image data until the formation of the plural color image the second area is complete.

7. An image forming apparatus, comprising:

an image reading-out unit configured to read out image data of a manuscript document image corresponding to a surface of a first manuscript document by optically scanning the manuscript document;

an automatic manuscript document conveying unit configured to automatically convey the first manuscript document to said image reading-out unit;

a latent image carrier configured to carry an electrostatic latent image of the manuscript document image read out by said image reading-out unit;

a developing unit configured to develop the electrostatic latent image carried on said latent image carrier by converting the electrostatic latent image to a toner image; and an intermediate transfer member on which a plural color image is formed, said intermediate transfer member being configured to transfer the toner image developed by said developing unit onto said transfer member and hold the toner image and at least one additional toner image on said transfer member;

a judgment unit configured to judge whether the manuscript document image of the first manuscript document is monochrome or color;

a memorizing unit configured to memorize the image data read out by said image reading-out unit; and a control unit configured to, in case that the first manuscript document is judged to be a monochrome document by said judgment unit, control the image forming apparatus such that the toner image is formed with a first color on a first area of said intermediate transfer member, a second manuscript document is conveyed with said document conveying unit, said memorizing unit memorizes the image data of the second manuscript document read out by said image reading-out unit and the toner image is formed with the first color on a second area of said intermediate transfer member at the same time.

8. The image forming apparatus of claim 7, wherein, in case that the second manuscript document is judged to be a color document, said control unit controls image formation of a second and subsequent colors of the second manuscript document on the second area on the basis of the image data read out from said memorizing unit.

9. The image forming apparatus of claim 8, wherein said control unit discharges the second manuscript document from said color image forming apparatus afer the image data of the second manuscript document is memorized in said memorizing unit.

10. The image forming apparatus of claim 7, wherein said control unit discharges the second manuscript document from said image forming apparatus after the image data of the second manuscript document memorized in said memorizing unit.

11. An image forming apparatus, comprising:

an image reading-out unit configured to read out image data of a manuscript document image corresponding to a surface of a first manuscript document by optically scanning the first manuscript document;

an automatic manuscript document conveying unit configured to automatically convey the first manuscript document to said image reading-out unit;

a latent image carrier configured to carry an electrostatic latent image of the manuscript document image read out by said image reading-out unit;

a developing unit configured to develop the electrostatic latent image carried on said latent image carrier by converting the electrostatic latent image to a toner image;

an intermediate transfer member on which a plural color image is formed, said transfer member being configured to transfer the toner image developed by said developing unit onto said transfer member and hold the toner image and at least one additional toner image on the transfer member;

a judgment unit configured to judge whether the manuscript document image is monochrome or color;

a memorizing unit configured to memorize the image data read out by said image reading-out unit; and a control unit configured to control said image forming apparatus such that said memorizing unit memorizes the image data of the first manuscript document read out by said image reading-out unit and image formation of the first manuscript document with the first color on a first area of said intermediate transfer member is performed at the same time, said manuscript document conveying unit conveys a second manuscript document, said memorizing unit memorizes image data of the second manuscript document read out by said image reading-out unit, and image formation of the second manuscript document with the first color on a second area of said intermediate transfer member is performed at the same time, image formation of a second and subsequent colors of the first manuscript document is performed on the first area on the basis of the image data read out from said memorizing unit, and image formation of the second and subsequent colors of the second manuscript document is performed on the second area on the basis of the image data read out from said memorizing unit.

12. A method of forming an image with an image forming apparatus, comprising the steps of:

reading out image data of a manuscript document image corresponding to a surface of a first manuscript document by optically scanning the first manuscript document with an image reading-out unit;

automatically conveying the first manuscript document to said image reading-out unit with an automatic manuscript document conveying unit;

carrying the electrostatic latent image of the manuscript document image read out by said image reading-out unit on a latent image carrier;

developing the electrostatic latent image carried on said latent image carrier by converting the electrostatic latent image to a toner image by use of a developing unit;

transferring the toner image developed by said developing unit onto an intermediate transfer member and holding the toner image on the intermediate transfer member;

forming the toner image and at least one additional toner image on said intermediate transfer member;

forming a plural color image on said intermediate transfer member;

transferring the plural color image onto transfer paper;

judging whether manuscript document image on the first manuscript document is monochrome or color with a judgment unit;

memorizing the image data read out by said image reading-out unit; and controlling the image forming apparatus, in case that the first manuscript document is judged to be a color document by said judgment unit, such that said memorizing unit memorizes image data read out by said image reading-out unit and the toner image of the first manuscript document is formed with a first color on a first area of said intermediate transfer member at the same time, a second manuscript document is conveyed with said document conveying unit, the toner image of the second document is formed with the first color on a second area of said intermediate transfer member, and the toner image is formed with a second and subsequent colors of said first manuscript document on the first area on the basis of the image data read out from said memorizing unit.

13. The method of claim 12, wherein, in case that the second manuscript document is judged to be a color document by said judgment unit, the method further comprises the step of:

forming the toner image with the second and subsequent colors on the second area by scanning the second manuscript document plural times with said image reading-out unit.

14. The method of claim 12, wherein, in case that the second manuscript document is judged to be a monochrome document by said judgment unit, the method further comprises the step of:

exhausting the second manuscript document from the image forming apparatus after finishing image formation with the first color on the second area.

15. The method of claim 12, wherein, in case that the second manuscript document is judged to be a monochrome document by said judgment unit, the method of further comprises the step of:

holding the second manuscript document on the reading-out position until formation of the plural color image on the first area is complete.

16. A method of forming an image with an image forming apparatus, comprising the steps of:

reading out image data of a manuscript document image corresponding to a surface of a first manuscript document by optically scanning the first manuscript document with an image reading-out unit;

automatically conveying the first manuscript document to said image reading-out unit with an automatic manuscript document conveying unit;

carrying an electrostatic latent image of the manuscript document image read out by said image reading-out unit on a latent image carrier;

developing the electrostatic latent image carried on said latent image carrier by converting the electrostatic latent image to a toner image with a developing unit;

transferring the toner image developed by said developing unit onto an intermediate transfer member and holding the toner image on the intermediate transfer member;

forming the toner image and at least one additional toner image on said intermediate transfer member;

forming a plural color image on said intermediate transfer member;

transferring the plural color image formed on said intermediate transfer member onto transfer paper;

judging whether the manuscript document image is monochrome or color with a judgment unit;

memorizing the image data read out by said image reading-out unit; and controlling the image forming apparatus, in case that the first manuscript document is judged to be a monochrome document by said judgment unit, such that said memorizing unit memorizes the image data read out by said image reading-out unit and the toner image is formed with a first color on a first area of said intermediate transfer member at the same time, a second manuscript document is conveyed with said document conveying unit, the additional toner image is formed with the first color on a second area of said intermediate transfer member, and the additional toner image is formed with a second and subsequent colors on the second area by scanning several times the second manuscript document with the image reading-out unit if the second manuscript document is judged to be a color document by said judgment unit.

17. The method of claim 16, further comprising the step of:

causing said memorizing unit to keep the memorized contents until image formation of the second manuscript document is complete.

18. A method of forming an image with an image forming apparatus, comprising the steps of:

reading out image data of a manuscript document image corresponding to a surface of a first manuscript document by optically scanning the first manuscript document with an image reading-out unit;

automatically conveying the first manuscript document to said image reading-out unit with an automatic manuscript document conveying unit;

carrying an electrostatic latent image of the manuscript document image read out by said image reading-out unit on a latent image carrier;

developing the electrostatic latent image carried on said latent image carrier by converting the electrostatic latent image to a toner image by use of a developing unit;

transferring the image developed by said developing unit onto an intermediate transfer member and holding the toner image on the intermediate transfer member;

forming the toner image and at least one additional toner image on said intermediate transfer member;

forming a plural color image on said intermediate transfer member;

transferring the plural color image formed on said intermediate transfer member on transfer paper;

judging whether the manuscript document image is monochrome or color with a judgment unit;

memorizing the image data read out by said image reading-out unit; and controlling said image forming apparatus, in case that the first manuscript document is judged to be a monochrome document by said judgment unit, such that said memorizing unit memorizes the image data read out by said image reading-out unit and the additional toner image is formed with a first color on a second area of said intermediate transfer member at the same time.

19. The method of claim 18, further comprising the step of:

forming a second and subsequent colors of a second manuscript document on a second area on the basis of the image data read out from said memorizing unit when the second manuscript document is judged to be a color document.

20. The method of claim 19, further comprising the step of:

discharging the second manuscript document from said image forming apparatus after the memorization of image data of the second manuscript document in said memorizing unit.

21. The method of claim 18, further comprising the step of:

discharging a second manuscript document from said image forming apparatus after the memorization of image data of the second manuscript document in said memorizing unit.

22. A method of forming an image with an image forming apparatus, comprising the steps of:

reading out image data of a manuscript document image corresponding to a surface of a first manuscript document by optically scanning the first manuscript document with an image reading-out unit;

automatically conveying the first manuscript document to said image reading-out unit with an automatic manuscript document conveying unit;

carrying an electrostatic latent image of the manuscript document image read out by said image reading-out unit on a latent image carrier;

developing the electrostatic latent image carried on said latent image carrier by converting the electrostatic latent image to a toner image with a developing unit;

transferring the toner image developed by said developing unit onto an intermediate transfer member and holding the toner image on the intermediate transfer member;

forming the toner image and at least one additional toner image on said intermediate transfer member;

forming a plural color image on said intermediate transfer member;

transferring the plural color image formed on the intermediate transfer member onto transfer paper;

judging whether the image on the first manuscript document is monochrome or color with a judgment unit;

memorizing the image data read out by said image reading-out unit; and controlling said image forming apparatus such that said memorizing unit memorizes the image data of the first manuscript document read out by said image reading-out unit and image formation is performed with a first color on a first area of said intermediate transfer member at the same time, said manuscript document conveying unit conveys a second manuscript document, said memorizing unit memorizes image data of the second manuscript document read out by said image reading-out unit, and image formation of the second manuscript document with the first color on a second area of said intermediate transfer member is performed at the same time, image formation of a second and subsequent colors of the first manuscript document is performed on the first area on the basis of the image data read out from said memorizing unit, and image formation of the second and subsequent colors of the second manuscript document is performed on the second area on the basis of the image data read out from said memorizing unit.

23. An image forming apparatus, comprising:

an image reading-out section configured to read out at least two surfaces of a manuscript document and configured to read out full-color image information by scanning only once the manuscript document;

an automatic manuscript document feeding section configured to send the manuscript document to said image reading-out section for reading out the manuscript document and configured to withdraw the manuscript document read out from said image reading-out section;

an intermediate transfer member onto which a black toner image of the first manuscript document is transferred, said intermediate transfer member being configured to transfer plural toner images at the same time;

a page memory configured to store image information read out when a first manuscript document sent to a first reading-out portion located at an upstream side of said image reading-out section is scanned and read out by the first reading-out portion, said first reading-out portion being configured to receive and scan a second manuscript document after receiving said first manuscript document;

a second reading-out portion to which the first manuscript document is sent, said second reading-out portion being located at a downstream side of said image reading-out section;

wherein, after the second manuscript document has been scanned, a black toner image of the second manuscript document is transferred to said intermediate transfer member and thereafter a next color toner image is transferred onto a position on said intermediate transfer member of the black toner image of the first manuscript document on the basis of the image information of the first manuscript document stored in said page memory, wherein, after scanning the second manuscript document a predetermined time corresponding to the black-and-white printing or the full-color printing, the first manuscript document and the second manuscript document are discharged from said image reading-out section, and additional manuscript documents subsequent to the first and second manuscript documents are sent to said image reading-out section.

24. The image forming apparatus of claim 23, wherein, in case that the second manuscript document is black-and-white, the first and the second manuscript documents are discharged from said image reading-out section after the second manuscript document is scanned.

25. The image forming apparatus of claim 23, wherein, in case that the first manuscript document is black-and-white, image information of the second manuscript document obtained by scanning and reading out the second manuscript document is stored in said page memory, and the first and the second manuscript documents are discharged from said image reading-out section after the second manuscript document is scanned.

26. An image forming apparatus, comprising:

an image reading-out section configured to read out at least two surfaces of a manuscript document and configured to read out full-color image information by scanning only once the manuscript document;

an automatic manuscript document feeding section configured to send the manuscript document to said image reading-out section for reading out the manuscript document and configured to withdraw the manuscript document read out from said image reading-out section;

an intermediate transfer member configured to transfer plural toner images at the same time and a first reading-out portion located at an upstream side of said image reading-out section, said first reading-out portion being configured to scan and read out image information of the first manuscript document;

a page memory configured to store the image information of the first manuscript document;

wherein, in the case a second manuscript document is in said automatic manuscript document feeding section, the black toner image of the first manuscript document is transferred onto said intermediate transfer member and said first manuscript document is sent to a second reading-out portion located at the downstream side of said image reading-out section, wherein first page of the second manuscript document is sent to said first reading-out portion, wherein, after the second manuscript document has been scanned once, a black toner image of the second manuscript document is transferred to said intermediate transfer member and thereafter a next color toner image is transferred onto a position on said intermediate transfer member of the black toner image of the first manuscript document on the basis of the image information of the first manuscript document stored in said page memory, wherein, at the time point of finishing such processing as mentioned above by repeating the operation of scanning the second manuscript document for a predetermined number of times corresponding to the black-and-white printing or the full-color printing, the first manuscript document and the second manuscript document are discharged from said image reading-out section, and wherein next manuscript documents subsequent to the first and second manuscript documents are sent to said image reading-out section.

27. The image forming apparatus of claim 26, wherein, in case that the second manuscript document is black-and-white, the first and the second manuscript documents are discharged from said image reading-out section after the second manuscript document is scanned.

28. The image forming apparatus of claim 26, wherein, in case that the first manuscript document is black-and-white, image information of the second manuscript document obtained by scanning and reading out the second manuscript document is stored in said page memory, and the first and the second manuscript documents are discharged from said image reading-out section after the second manuscript document is scanned.

29. An image forming apparatus, comprising:

an image reading-out section configured to read out at least two surfaces of a first manuscript document and read out fall-color image information by scanning only once the first manuscript document;

an automatic manuscript document feeding section configured to send the first manuscript document to said image reading-out section for reading out the first manuscript document and configured to withdraw the first manuscript document read out from said image reading-out section;

an intermediate transfer member configured to transfer plural toner images at the same time;

a first reading-out portion located at the upstream side of said image reading-out section, configured to scan and read out image information of the first manuscript document;

a page memory in which the image information of the first manuscript document is stored:

a second reading-out portion located at the downstream side of said image reading-out section, said second reading-out portion being configured to receive said first manuscript document;

wherein the second manuscript document is sent to said first reading-out portion, wherein image information of the second manuscript document obtained by scanning and reading out the second manuscript document is stored in said page memory, wherein the first ad second manuscript documents are discharged from said image reading-out section after the second manuscript document is scanned, and a next manuscript document is sent to said image reading-out section, and wherein, when the next manuscript document is sent to the image reading-out section, the toner image is transferred to said intermediate transfer member on the basis of the image information of the first and second manuscript documents stored in said page memory.

30. A method of forming an image, comprising the steps of:

reading out at least two surfaces of a first manuscript document and reading out full-color image information by scanning only once the first manuscript document;

sending the first manuscript document to an image reading-out section to read out the first manuscript document and withdrawing the manuscript document read out from said image reading-out section;

transferring plural toner images at the same time with an intermediate transfer member;

scanning and reading-out the first manuscript document sent to a first reading-out portion located at the upstream side of said image reading-out section;

storing the image information thus read out by the scanning operation in a page memory;

transferring a black toner image of the first manuscript document onto said intermediate transfer member;

sending the first manuscript document to a second reading-out portion located at the downstream side of said image reading-out section;

sending the second manuscript document to said first reading-out portion, transferring the black toner image of the second manuscript document to said intermediate transfer member at the time point of finishing the first-time scanning of a second manuscript document, and thereafter transferring the next color toner image onto a position on said intermediate transfer member of the black toner image of the first manuscript document on the basis of the image information of the first manuscript document stored in said page memory;

discharging the first manuscript document and the second manuscript document from said image reading-out section, at the time point of finishing such processing as mentioned above by repeating the operation of scanning the second manuscript document for a predetermined number of times corresponding to black-and-white printing or full-color printing; and sending next manuscript documents subsequent to the first and second manuscript documents to said image reading-out section.

31. The method of claim 30, further comprising the step of:

discharging the first and second manuscript documents from said image reading-out section after the second manuscript document is scanned, in case that the second manuscript document is black-and-white.

32. The method of claim 30, further comprising the steps of:

storing image information of the second manuscript document obtained by scanning and reading out the second manuscript document, in said page memory, in case that the first manuscript document is black-and-white; and discharging the first and second manuscript documents from said image reading-out section after the second manuscript document is scanned.

33. A method of forming an image, comprising the steps of:

reading out at least two surfaces of a first manuscript document and reading out full-color image information by scanning only once the first manuscript document;

sending the first manuscript document to an image reading-out section for reading out the manuscript document and for withdrawing the manuscript document read out from said image reading-out section;

transferring plural toner images at the same time with an intermediate transfer member;

scanning and reading out a first manuscript document sent to a first reading-out portion located at the upstream side of said image reading-out section as the manuscript document of the last page in the odd number sheets of the manuscript document;

storing the image information thus read out by the scanning operation read out by the scanning operation in a page memory;

transferring a black toner image of the first manuscript document onto said intermediate transfer member;

sending said first manuscript document to a second reading-out portion located at the downstream side of said image reading-out section at this time, in case that there exists other manuscript document in an automatic manuscript document feeding section;

sending the first page of the other manuscript document to said first reading-out portion as a second manuscript document, transferring a black toner image of the second manuscript document to said intermediate transfer member at the time point of finishing the first-time scanning of a second manuscript document, and thereafter transferring the next color toner image onto a position on said intermediate transfer member of the black toner image of the first manuscript document on the basis of the image information of the first manuscript document stored in said page memory;

discharging the first manuscript document and the second manuscript document from said image reading-out section, at the time point of finishing such processing as mentioned above by repeating the operation of scanning the second manuscript document a predetermined number of times corresponding to black-and-white printing or full-color printing; and sending next manuscript documents subsequent to the first and second manuscript documents to said image reading-out section.

34. The method of claim 33, further comprising the step of:

discharging the first and second manuscript documents from said image reading-out section after the second manuscript document is scanned, in case that the second manuscript document is black-and-white.

35. The method of claim 33, further comprising the steps of:

storing image information of the second manuscript document obtained by scanning and reading out the second manuscript document in said page memory, in case that the first manuscript document is black-and-white; and discharging the first and second manuscript documents from said image reading-out section after the second manuscript document is scanned.

36. A method of forming an image, comprising the steps of:

reading out at least two surfaces of a first manuscript document and reading out full-color image information by scanning only once the first manuscript document;

sending the first manuscript document to an image reading-out section for reading out the manuscript document and for withdrawing the manuscript document read out from said image reading-out section;

transferring plural toner images at the same time with an intermediate transfer member;

scanning and reading out image information of the first manuscript document sent to a first reading-out portion located at an upstream side of said image reading-out section;

storing the image information of the first manuscript document, in a page memory;

sending the first manuscript to a second reading out portion located at a downstream side of said image reading-out section;

sending a second manuscript document to the first reading-out portion;

storing image information of the second manuscript document obtained by scanning and reading-out the second manuscript document, in said page memory;

discharging the first and second manuscript documents from said image reading-out section after the second manuscript document is scanned, and sending a next manuscript document to said image reading-out section; and transferring at the same time, the toner image to said intermediate transfer member on the basis of the image information of the first and second manuscript documents stored in said page memory.

37. An image forming apparatus comprising:

an image reading unit configured to read out first and subsequent manuscript document images by optically scanning a first manuscript document and a subsequent manuscript document, respectively;

a photosensitive body configured to carry an electrostatic latent image of the first manuscript document image read out by said image reading-out unit;

a developing unit configured to develop the electrostatic latent image and generate a visible image corresponding to said electrostatic latent image on said photosensitive body;

a transfer member configured to transfer visible images generated by the developing unit onto transfer paper;

an intermediate transfer member configured to receive visible images generated on said photosensitive body and configured to simultaneously transfer to the transfer member at least two images received from said photosensitive body;

a judgment unit configured to judge whether the first manuscript document image is monochrome or color;

a memory configured to store the image data read out by said image reading unit; and a control unit configured to, in case that the manuscript document is judged to be a color document, command said memory unit to store the image data corresponding to the first manuscript document read out by said image reading-out unit, command the developing unit to generate a visible image corresponding to said first manuscript document in a first color, command said intermediate transfer member to receive the visible image corresponding the first manuscript document in the first color on a first area of said intermediate transfer member, command the developing unit to generate a visible image corresponding to the subsequent manuscript document in the first color, command said intermediate transfer member to receive the visible image corresponding to the subsequent manuscript document in the first color on a second area of said intermediate transfer member, and cause a visible image corresponding to the first manuscript document to be formed in colors different from said first color on the first area based on the image data read out from said memory.

38. A method for forming images, comprising:

reading out first and subsequent manuscript document images by optically scanning a first manuscript document and a subsequent manuscript document, respectively;

generating an electrostatic latent image of the first manuscript document image read out by an image reading-out unit;

developing the electrostatic latent image to generate a visible image corresponding to said electrostatic latent image;

transferring visible images to an intermediate transfer member;

transferring simultaneously at least two images received from said intermediate transfer member to a transfer member;

determining whether the first manuscript document image is monochrome or color; and controlling the substeps of storing the image data corresponding to the first manuscript document, generating a visible image corresponding to said first manuscript document in a first color, forming the visible image corresponding to the first manuscript document in the first color on a first area of said intermediate transfer member, generating a visible image corresponding to the subsequent manuscript document in the first color, forming the visible image corresponding a the subsequent manuscript document in the first color on a second area of said intermediate transfer member, and forming a visible image corresponding to the first manuscript document in colors different from said first color on the first area based on the stored image data if the first manuscript document is determined to be a color document.

39. An image forming apparatus, comprising:

means for reading out a manuscript document image corresponding to a surface of a first manuscript document by optically scanning the first manuscript document;

means for automatically conveying the first manuscript document to said means for reading out;

means for carrying an electrostatic latent image of the manuscript document image read out by said means for reading out;

means for developing the electrostatic latent image carried on said means for carrying by converting the electrostatic latent image to a toner image;

means for transferring the toner image developed by said means for developing to an intermediate transfer member and holding the image on the intermediate transfer member;

means for forming the toner image and at least one additional toner image on said intermediate transfer member;

means for forming a plural color image on said intermediate transfer member;

means for transferring the plural color image onto transfer paper;

means for judging whether manuscript document image on the first manuscript document is monochrome or color;

means for memorizing the image data read out by said means for reading out; and means for controlling the image forming apparatus if the first manuscript document is judged to be a color document, such that said means for memorizing memorizes the image data at the same time the toner image is formed with a first color on a first-area of said intermediate transfer member, said conveying means conveys a second manuscript document, the additional toner image is formed with the first color on a second area of said intermediate transfer member, and the additional toner image is formed with a second and subsequent colors of said first manuscript document on the first area on the basis of the image data read out from said means for memorizing.

40. An image forming apparatus, comprising:

means for reading out a manuscript document image corresponding to a surface of a first manuscript document by optically scanning the first manuscript document;

means for automatically conveying the first manuscript document to said means for reading out;

means for carrying an electrostatic latent image of the manuscript document image read out by said means for reading out;

means for developing the electrostatic latent image carried by converting the electrostatic latent image to a toner image;

means for transferring the toner image onto an intermediate transfer member and holding the toner image on the intermediate transfer member;

means for forming the toner image and at least one additional toner image on said intermediate transfer member;

means for forming a plural color image on said intermediate transfer member;

means for transferring the plural color image formed on said intermediate transfer member onto transfer paper;

means for judging whether the manuscript document image is a monochrome or color document;

means for memorizing the image data read out by said means for reading out; and control means for causing, in case that the first manuscript document is judged to be a monochrome document by said judging means, said memorizing means to memorize the image data read out by said means for reading out and formation of the toner image with a first color on a first area of said intermediate transfer member at the same time, a second manuscript document to be conveyed by said conveying means, the formation of the additional toner image with the first color on a second area of said intermediate transfer member, and the formation of the additional toner image with a second and subsequent colors on the second area by scanning several times the second manuscript document with the means for reading out.

41. An image forming apparatus, comprising:

means for reading out a manuscript document image corresponding to a surface of a first manuscript document by optically scanning the first manuscript document;

means for automatically conveying the first manuscript document to said means for reading out;

means for carrying the electrostatic latent image of the manuscript document image read out by said means for reading out;

means for developing the electrostatic latent image by converting the electrostatic latent image to a toner image;

means for transferring the toner image onto an intermediate transfer member and holding the toner image on the intermediate transfer member;

means for forming the toner image and at least one additional toner image corresponding to at least one additional surface of the first manuscript document on said intermediate transfer member;

means for forming a plural color image on said intermediate transfer member;

means for transferring the plural color image formed on said intermediate transfer member on transfer paper;

means for judging whether the manuscript document image is a monochrome or color document;

means for memorizing the image data read out by said means for reading out; and control means for causing, in case that the first manuscript document is judged to be a monochrome document by said means for judging, the memorization of the image data and the formation of the additional toner image with a first color on a second area of said intermediate transfer member to occur at the same time.

42. An image forming apparatus, comprising:

means for reading out a manuscript document image corresponding to a surface of a first manuscript document by optically scanning the first manuscript document;

means for automatically conveying the first manuscript document to said means for reading out;

means for carrying the electrostatic latent image of the first manuscript document image read out by said image reading-out unit on a latent image carrier;

means for developing the electrostatic latent image carried on said latent image carrier by converting the electrostatic latent image to a toner image by use of a developing unit;

means for transferring the toner image developed by said developing unit onto an intermediate transfer member and holding the toner image on the intermediate transfer member;

means for forming the toner image and at least one additional toner image corresponding to at least one additional surface of the first manuscript document, on said intermediate transfer member;

means for forming a plural color image on said intermediate transfer member;

means for transferring the plural color image formed on the intermediate transfer member onto transfer paper;

means for judging whether the image on the first manuscript document is monochrome or color with a judgment unit;

means for memorizing the image data read out by said means for reading out; and means for controlling the image forming apparatus such that said memorizing unit memorizes the image data of the first manuscript document at the same time the toner image is formed with a first color on a first area of said intermediate transfer member, said means for conveying conveys a second manuscript document, said means for memorizing memorizes image data of the second manuscript document read out by said means for reading out, and the toner image of the second manuscript document is formed with the first color on a second area of said intermediate transfer member at the same time, a second and subsequent colors of the first manuscript document are formed on the first area on the basis of the image data read out from said memorizing unit, and the second and subsequent colors of the second manuscript document are formed on the second area on the basis of the image data read out from said memorizing unit.

* * * * *